US009098125B2

(12) United States Patent
Yoshida

(10) Patent No.: US 9,098,125 B2
(45) Date of Patent: Aug. 4, 2015

(54) INFORMATION INPUT HELP SHEET, INFORMATION PROCESSING SYSTEM USING THE INFORMATION INPUT HELP SHEET, PRINT-ASSOCIATED OUTPUT SYSTEM USING THE INFORMATION INPUT HELP SHEET, AND CALIBRATION METHOD

(71) Applicant: Kenji Yoshida, Tokyo (JP)

(72) Inventor: Kenji Yoshida, Tokyo (JP)

(*) Notice: Subject to any disclaimer, the term of this patent is extended or adjusted under 35 U.S.C. 154(b) by 43 days.

(21) Appl. No.: 13/965,114

(22) Filed: Aug. 12, 2013

(65) Prior Publication Data

US 2014/0036169 A1    Feb. 6, 2014

Related U.S. Application Data

(62) Division of application No. 12/672,579, filed as application No. PCT/JP2008/002188 on Aug. 8, 2008, now Pat. No. 8,523,081.

(30) Foreign Application Priority Data

Aug. 9, 2007   (JP) .................................. 2007-230776

(51) Int. Cl.
| G06K 19/06 | (2006.01) |
| G06F 3/03 | (2006.01) |
| G06F 3/0354 | (2013.01) |
| G06F 3/041 | (2006.01) |

(52) U.S. Cl.
CPC ............ *G06F 3/0317* (2013.01); *G06F 3/0321* (2013.01); *G06F 3/03545* (2013.01); *G06F 3/0412* (2013.01)

(58) Field of Classification Search
CPC . G06F 3/0317; G06F 3/03545; G06F 3/0321; G06F 3/0412; G06F 3/0308; G06F 3/0346; G06F 3/03542; G06F 3/039; G06F 3/0416; G06F 3/042; G06F 3/0421; G06K 15/105; G06K 19/06037; G06K 19/06046
USPC .................................. 235/494, 454, 375, 432
See application file for complete search history.

(56) References Cited

U.S. PATENT DOCUMENTS

| 5,075,558 | A | * | 12/1991 | Nakagawa ..................... 250/556 |
| 5,522,623 | A | * | 6/1996 | Soules et al. ..................... 283/91 |
| 2005/0170173 | A1 | * | 8/2005 | Coguelin et al. .............. 428/340 |
| 2006/0082557 | A1 | | 4/2006 | Ericson et al. |

(Continued)

FOREIGN PATENT DOCUMENTS

| EP | 1548635 A1 | 7/2006 |
| GB | 2416895 A | 2/2006 |

(Continued)

*Primary Examiner* — Thien M Le
(74) *Attorney, Agent, or Firm* — Westerman, Hattori, Daniels & Adrian, LLP

(57) ABSTRACT

The technical objective is to provide a simple and low-cost information input help sheet and an information processing system which exhibit a significantly high input accuracy and input efficiency without limiting a mounting object. The information input help sheet comprises an infrared reflection layer which reflects infrared rays from one side and transmits visible light, and a dot pattern layer provided on one side of the infrared reflection layer and on which dots generated by a dot-code generating algorithm and formed with material having an infrared absorbing characteristic are arranged according to a predetermined rule, in order to perform a variety of multimedia information output and/or operation instructions.

19 Claims, 26 Drawing Sheets

(56) References Cited

U.S. PATENT DOCUMENTS

| | | | |
|---|---|---|---|
| 2008/0246388 A1* | 10/2008 | Cheon et al. | 313/501 |
| 2009/0015548 A1* | 1/2009 | Tazaki et al. | 345/156 |
| 2011/0188071 A1* | 8/2011 | Yoshida | 358/1.15 |
| 2012/0224229 A1* | 9/2012 | Yoshida | 358/3.06 |

FOREIGN PATENT DOCUMENTS

| | | |
|---|---|---|
| JP | 62-147581 A | 7/1987 |
| JP | 62-278084 A | 12/1987 |
| JP | 01-292420 A | 11/1989 |
| JP | 06-081029 U | 11/1994 |
| JP | 3013298 A | 4/1995 |
| JP | 08-006723 A | 1/1996 |
| JP | 08-076907 A | 3/1996 |
| JP | 09-327988 A | 12/1997 |
| JP | 10-171600 A | 6/1998 |
| JP | 2001-092595 A | 4/2001 |
| JP | 2003-256122 A | 9/2003 |
| JP | 2003-256137 A | 9/2003 |
| JP | 2004-139534 A | 5/2004 |
| JP | 2005-011045 A | 1/2005 |
| WO | 2006-065380 A1 | 6/2006 |
| WO | 2007-022397 A1 | 2/2007 |

* cited by examiner

THEREFORE, INFRARED RAYS ARE NEEDED TO BE DIFFUSELY REFLECTED IN ORDER TO BE ENTERED INTO THE LENS

*INFRARED RAYS ARE DIFFUSELY REFLECTED OVER THE WHOLE IMAGING REGION AND ENTERED INTO THE LENS

DOT PATTERN LAYER

INFRARED DIFFUSION LAYER

INFRARED DIFFUSION LAYER

PROTECTION LAYER

DOT PATTERN LAYER

ADHESIVE LAYER

DOT PATTERN LAYER

INFRARED DIFFUSION LAYERS

INFRARED DIFFUSION LAYERS

PROTECTION LAYER

ADHESIVE LAYER

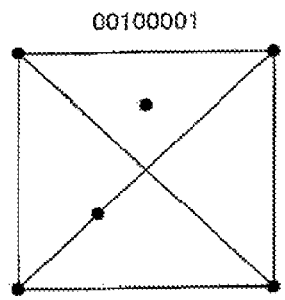
FIG.10A
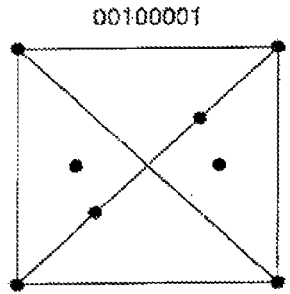
FIG.10B
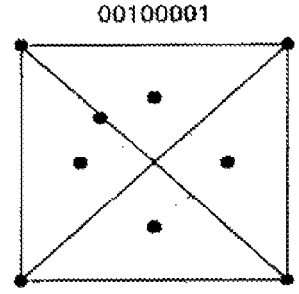
FIG.10C
| $I_3$ | $I_4$ | $I_5$ |
|---|---|---|
| $I_2$ | $I_1$ | $I_6$ |
2 × 3
FIG.11A
| $I_3$ | $I_4$ | $I_5$ |
|---|---|---|
| $I_2$ | $I_1$ | $I_6$ |
| $I_9$ | $I_8$ | $I_7$ |
3 × 3
FIG.11B
| $I_5$ | $I_6$ | $I_7$ |
|---|---|---|
| $I_4$ | $I_1$ | $I_8$ |
| $I_3$ | $I_2$ | $I_9$ |
| $I_{12}$ | $I_{11}$ | $I_{10}$ |
3 × 4
FIG.11C
| $I_{36}$ | $I_{17}$ | $I_{18}$ | $I_{19}$ | $I_{20}$ | $I_{21}$ |
|---|---|---|---|---|---|
| $I_{35}$ | $I_{16}$ | $I_5$ | $I_6$ | $I_7$ | $I_{22}$ |
| $I_{34}$ | $I_{15}$ | $I_4$ | $I_1$ | $I_8$ | $I_{23}$ |
| $I_{33}$ | $I_{14}$ | $I_3$ | $I_2$ | $I_9$ | $I_{24}$ |
| $I_{32}$ | $I_{13}$ | $I_{12}$ | $I_{11}$ | $I_{10}$ | $I_{25}$ |
| $I_{31}$ | $I_{30}$ | $I_{29}$ | $I_{28}$ | $I_{27}$ | $I_{26}$ |
6 × 6
FIG.11D

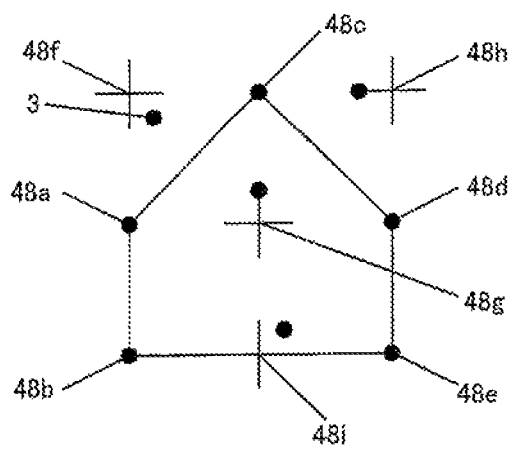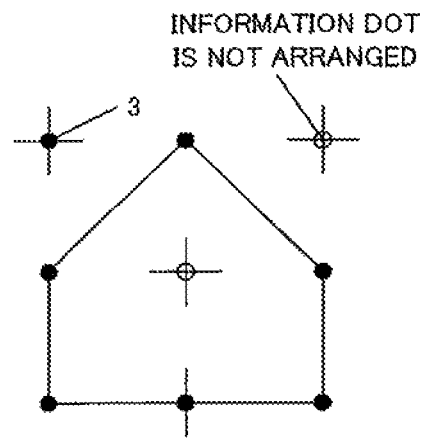
FIG.12A  FIG.12B
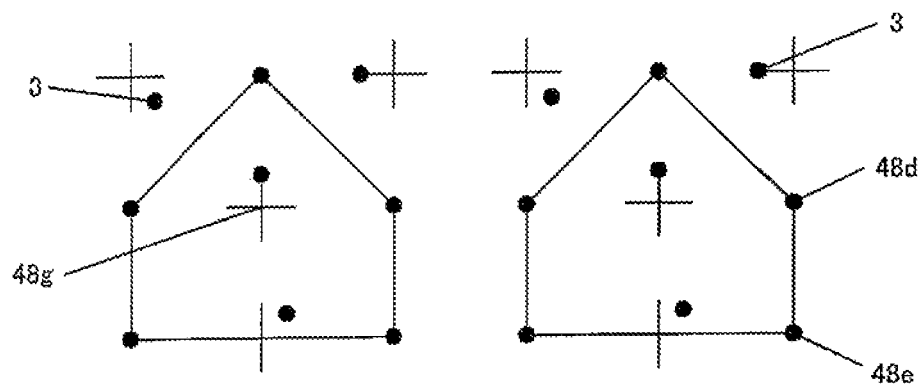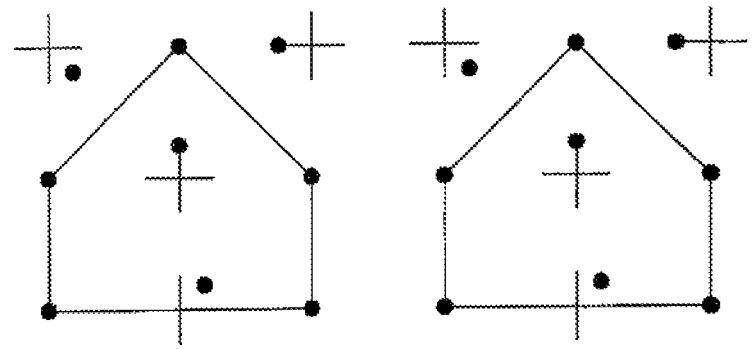
FIG.12C

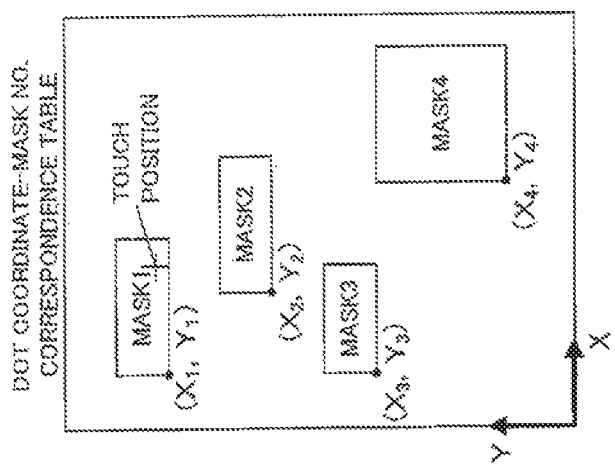
FIG. 17C
FIG. 17B
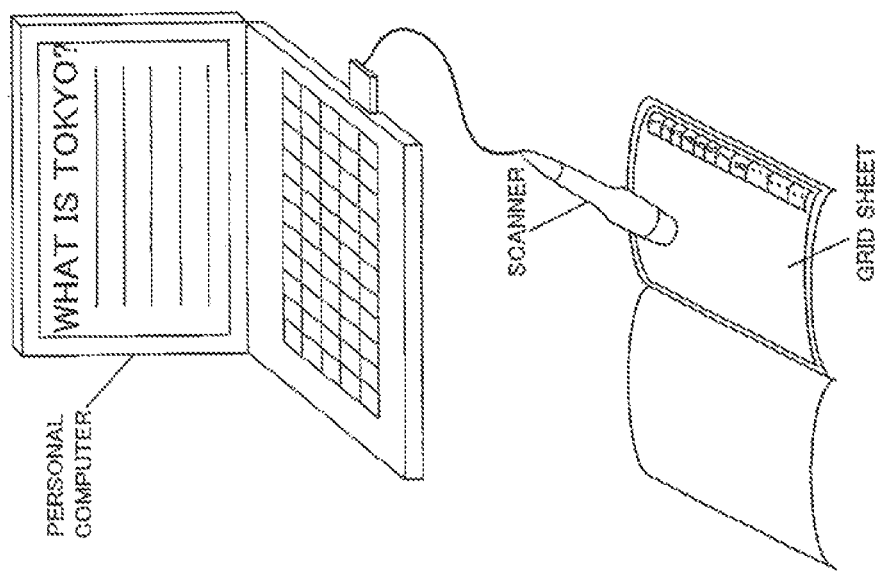
FIG. 17A

*CALIBRATION MARKS ARE NOT PRINTED ON GRID SHEET

INFORMATION INPUT HELP SHEET, INFORMATION PROCESSING SYSTEM USING THE INFORMATION INPUT HELP SHEET, PRINT-ASSOCIATED OUTPUT SYSTEM USING THE INFORMATION INPUT HELP SHEET, AND CALIBRATION METHOD

CROSS REFERENCE TO RELATED APPLICATIONS

This application claims priority under 35 U.S.C. 119 based upon Japanese Patent Application No. 2007-230776, filed on Aug. 9, 2007. Pursuant to 35 U.S.C. 121, this application is also a divisional application of U.S. patent application Ser. No. 12/672,579, filed on Jan. 26, 2011. The entire disclosures of the aforesaid applications are incorporated herein by reference.

FIELD OF THE INVENTION

The present invention relates to a sheet printed with a dot pattern and an information processing system using the sheet.

BACKGROUND OF THE INVENTION

In operations of a personal computer, a PDA, a portable terminal, and the like, input techniques done directly by a fingertip, a touch pen, or the like on a screen are conventionally known (for example, refer to Japanese Patent Application Publication No. 10-171600).

Such conventional techniques employ a method in which a piezoelectric or optical touch panel recognizes a coordinate at which a touch pen is manipulated and the control is informed to a control unit.

However, in the conventional touch panel technologies, parts and materials used are costly, and most of such parts and materials are produced integrally with hardware. Therefore, devices, such as a personal computer and an ATM, equipped with touch panels become very expensive.

To solve such a problem, in some cases, touch panels for being detachably mounted on display units have been developed (for example, refer to Japanese Patent Application Publication No. 2001-92595).

[Patent Document 1] Japanese Patent Application Publication No. 10-171600

[Patent Document 2] Japanese Patent Application Publication No. 2001-97595

SUMMARY OF THE INVENTION

However, touch panels for being mounted on hardware that is already in use were not available widely and easily, as they were expensive as well as machine types to be mounted and use conditions were limited. In addition, this approach was flawed, since the touch panels detachably mounted on display units were mostly piezoelectric types, reaction to input through the touch panel was not good enough. Also, as input was done by touching the touch panel directly with a finger, the touch panel itself became dirty, degrading recognition performance of the display unit.

Moreover, conventional detachable touch panels have been proposed only for attaching onto display units. Touch panels of other types such as the ones used on prints or media have not been proposed.

In this regard, an information input help sheet and information processing system is proposed, which is easy to use and low cost, provides excellent input accuracy and input efficiency, and can be attached to a variety of media.

This information input help sheet is placed, for example, on an existing display screen. If a user touches an icon or the like of normal size, etc by a scanner pen through the information input help sheet, information corresponding to the icon or the like is output.

Moreover, this information input help sheet is used, for example, by covering an existing print. If a user touches a text or a drawing pattern on the print through the information input help sheet with a scanner pen, information corresponding to the text or drawing pattern is output from a display unit, speaker and the like.

With a conventional touch panel, large icons were equipped as the icons were touched by a finger. Allowable range of precision error when inputting was wide, and input accuracy of the touch panel was not required to be high.

However, with the information input help sheet assumed to be used with existing screen displays or prints, high input accuracy may be required when touching displayed images and printed drawing patterns, since the existing icon displays or print indications are not made in consideration of instructions by touching, and the indications are smaller.

The invention is made in consideration of such points, and aims to technically provides an information input help sheet and information processing system which is easy to use and low cost, provides excellent input accuracy and input efficiency, and can be attached to a variety of media, and a calibration method for using the information input help sheet, which can accurately match horizontal and vertical ratios of the information input help sheet to the same ratios of a screen or print with an easy method to realize high input accuracy.

Specifically, a first aspect of the invention is an information input help sheet, disposed on a printed surface of a print or on a display screen of a display unit, and on which is provided a dot pattern to be read by an optical reading unit in order to output information relating to an image of the print or to a display of the display unit, comprising an infrared reflection layer which has a characteristic to reflect infrared rays from one side and transmit visible light, and a dot pattern layer provided on the one side of the infrared reflection layer and on which dots generated by a dot-code generating algorithm and formed with material having an infrared, absorbing characteristic are arranged according to a predetermined rule in order to perform a variety of multimedia information output and/or operation instructions.

According to this, the characteristic, in terms of infrared absorption and transmission, of a medium surface on which the information input help sheet is placed, does not affect imaging of the dot pattern, since the sheet reflects infrared rays irradiated from the infrared irradiation unit. As a result, only the bright and clear dot pattern can be, imaged, and a dot code can be accurately analyzed. Moreover, easy to use and low cost information input help sheet can be provided.

A second aspect of the invention is the information input help sheet according to the first aspect, wherein an infrared diffusion layer that transmits visible light and diffuses the infrared rays is provided between the infrared reflection layer and the dot pattern layer.

According to this, infrared rays can be evenly entered into a lens by diffusely reflecting the irradiated infrared rays even in a part of imaging region where an infrared reflection layer prevents the irradiated infrared rays from entering into the lens by specular reflection.

A third aspect of the invention is the information input help sheet according, to the first aspect, wherein an infrared diffusion layer that transmits visible light and diffuses infrared light is provided on one side of the dot pattern layer.

According to this, an infrared diffusion layer can be provided over a dot pattern layer provided on the top surface of an infrared reflection layer, or an infrared reflection layer can be provided over a dot pattern layer provided on the rear side of an infrared diffusion layer. Further, the infrared diffusion layer can also function as a simplified protection layer for the dot pattern layer.

A fourth aspect of the invention is an information input help sheet, disposed on a printed surface of a print or on a display screen of a display unit, and on which is provided a dot pattern to be read by an optical reading, unit in order to output information relating to an image of the print or to a display of the display unit, comprising an infrared diffuse reflection layer that has a characteristic to diffusely reflect infrared rays from one side and transmit visible light, and a dot pattern layer provided on the one side of the infrared diffuse reflection layer and on which dots generated by a dot-code generating algorithm and formed with material having an infrared absorbing characteristic are arranged according to a predetermined rule in order to cause recognition of a variety of multimedia information output and/or operation instructions.

According to this, since one layer can diffusely reflect infrared rays to the direction of the incident infrared rays, the information input help sheet can be even slimmer, and the production processes of the information input help sheet can be reduced thereby reducing the cost.

A fifth aspect of the invention is the information input help sheet according to any one of the first to fourth aspects wherein a protection layer that has a characteristic to transmit infrared light and invisible light is provided on one side of the dot pattern layer or one side of the infrared diffusion layer.

This prevents dots from wearing and dirt, and enables longer use period of the sheet.

A sixth aspect of the invention is the information input help sheet according to any one of the first to fifth aspects, wherein the infrared reflection layer or the infrared diffuse reflection layer further has a characteristic to reflect infrared rays from the other side.

According to this, the information input help sheet can block infrared rays from a display screen or a screen on which the information input help sheet of the invention is attached, and allows the infrared light irradiated from the infrared irradiation unit to be the only irradiation light. As a result, only bright and clear dot pattern can be imaged, and the dot code can be accurately analyzed.

A seventh aspect of the invention is an information input help sheet, disposed on a printed surface of a print or on a display screen of a display unit, and on which is provided a dot pattern to be read by an optical reading unit in order to output information relating to an image of the print or to a display of the display unit, comprising, an infrared reflection layer that has a characteristic to reflect infrared rays from each side to a respective direction and transmit visible light, and a dot pattern layer provided on both sides of the infrared reflection layer and on which dots generated by a dot-code generating algorithm and formed with material having an infrared absorbing characteristic are arranged according to a predetermined rule in order to cause recognition of a variety of multimedia information output and or operation instructions.

According to this, since it is possible to use both sides of the information input help sheet, both front and rear sides can be used without distinguishing therebetween, which enhances convenience for users.

An eighth aspect of the invention is the information input help sheet according to the seventh aspect, wherein an infrared diffusion layer that transmits visible light and diffuses infrared light from respective direction is provided between the infrared reflection layer and the dot pattern layer on each side.

According to this, infrared rays can be evenly entered into a lens by diffusely reflecting the irradiated infrared rays even in a part of imaging region where an infrared reflection layer prevents the irradiated infrared rays from entering into the lens by specular reflection.

A ninth aspect of the invention is the information input help sheet according, to the seventh aspect, wherein an infrared diffusion layer that transmits visible light and diffuses infrared light from respective direction is provided on a further external surface of the each side of the dot pattern layer.

According to this, an infrared diffusion layer can be provided over a dot pattern layer provided on the top surface of an infrared reflection layer, or an infrared reflection layer can be provided over a dot pattern layer provided on the rear side of an infrared diffusion layer. Further, the infrared diffusion layer and the infrared reflection layer can also function as simplified protection layers for the dot pattern layer.

A tenth aspect of the invention is an information input help sheet, disposed on a printed surface of a print or on a display screen of a display unit, and on which is provided a dot pattern to be read by an optical reading unit in order to output information relating to an image of the print or to a display of the display unit, comprising an infrared diffuse reflection layer that has a characteristic to diffusely reflect infrared rays from each side and transmit visible light, and a dot pattern layer provided on both sides of the infrared diffuse reflection layer and on which dots generated by a dot-code generating algorithm and formed with material having an infrared absorbing characteristic are arranged according to a predetermined rule in order to cause recognition of a variety of multimedia information output and/or operation instructions.

According to this, since one layer can diffusely reflect infrared rays to the direction of incident infrared rays, the information input help sheet can be even slimmer, and the production processes of the information input help sheet can be reduced thereby reducing the cost.

An eleventh aspect of the invention is the information input help sheet according to any one of seventh to tenth aspects, wherein a protection layer that has a characteristic to transmit infrared light and visible light from respective directions is provided on a further external surface of the dot pattern layer on each side or a further external surface of the infrared diffusion layer.

This prevents dots from wearing and dirt, and enables longer use period of sheet.

A twelfth aspect of the invention is the information input help sheet according to any one of seventh to eleventh aspects, wherein the dot pattern is made into a pattern with a coordinate value and/or a code value different between one side and the other side of an infrared reflection layer.

According to this, one information input help sheet can be used for two different kinds of purposes, which enhances convenience and flexibility.

A thirteenth aspect of the invention is the information input help sheet according to any one of the first to twelfth aspects, wherein the dot pattern layer or other layers are superimposed and printed with a text, an illustration, a photograph, or the like with material transmitting infrared rays or material reflecting infrared rays.

According to this, since, icons and drawing patterns, etc., such as an operation button, can be superimposed and printed with a dot pattern of the information input help sheet, a fixed variety of multimedia information output and/or operation instructions can be clearly expressed, which allows to widen use purposes and enhance convenience.

A fourteenth aspect of the invention is the information input help sheet according to any one of the first to thirteenth aspects, wherein an adhesion layer is provided on a side not facing the dot pattern layer of the infrared reflection layer or a side not facing the dot pattern layer of the infrared diffuse reflection layer.

According to this, it is possible to easily attach the information input help sheet on a display unit, etc.

A fifteenth aspect of the invention is the information input help sheet according to any one of the first to fourteenth aspects, wherein the dot pattern is made into a pattern with an XY coordinate value and/or a code value based on a predetermined algorithm.

According to this, it is possible to easily output a variety of multimedia information, as well as read coordinate information and/or code information of the position touched by the scanner, recognize the touch position, and perform the corresponding operation instruction.

A sixteenth aspect of the invention is an information processing system using, the information input help sheet according to any one of the first to fifteenth aspects, wherein the information input help sheet is provided on a display screen of a display unit of an information processing device, and the information processing system enables touch-panel style input by reading an dot pattern on the information input help sheet by a dot-pattern reading unit and secondarily inputs into the information processing device based on the dot pattern read out by the dot-pattern reading unit.

According to this, a function as a touch panel can be provided only by attaching the information input help sheet on which a dot pattern is formed to the display screen of a display unit and touching the sheet by a dot-pattern reading unit, which realizes an simplified and low-cost information processing system.

A seventeenth aspect of the invention is a system for outputting content-related information using the information input help sheet according to any one of the first to fifteenth aspects, wherein the information input help sheet is provided, in an information processing device, on a display screen of a display unit displaying content represented by a text, an illustration, a photograph and the like, the system enables touch-panel style input by reading an XY coordinate value and/or a code value of a dot pattern on the information input help sheet by a dot-pattern reading unit and converting into an xy coordinate in format information of the content displayed on the display unit, recognizes content-specific information of a position touched by the dot-pattern reading unit, and searches and outputs content-related information relating to the content-specific information According to this, a text, an illustration, a photograph, and the like on a display unit can be specified and the detailed description thereof can be displayed on the screen just by placing the information input help sheet on the display unit and touching the sheet with the dot-pattern reading unit. Therefore, relevant information can be accessed even for a text, an illustration, a photograph, an address, or the like for which a link is not set on a Web site or the like, thereby enhancing convenience for users. It should be noted that content-specific information may be instruction of operation.

An eighteenth aspect of the invention is an information processing system using the information input help sheet according to sixteen or seventeen aspect, wherein the information processing device is a personal computer, a PDA, a television receiving set, a front or rear projector, a game machine, a karaoke machine, a mobile phone terminal, a POS terminal, an ATM, a KIOSK terminal, a car navigation system, a pachinko, a watch, or a smart phone, and the information processing device is disposed, as a touch-panel style input device, on a display screen of a display unit or a screen.

According to this, the information processing system using the information input help sheet may be used for any device having a display unit or a screen.

A nineteenth aspect of the invention is a system for outputting print-related information using the information input help sheet according to any one of the first to fifteenth aspects, wherein the information input help sheet is used to cover a print surface of a print, and the system recognizes print information by reading a dot pattern on the information input help sheet with a dot-pattern reading unit and converting a recognized XY coordinate on the print surface and print-specific information identifying the print into an xy coordinate in the print information, and searches and outputs information relating to the print information.

According to this, it is possible, without directly printing a dot pattern on a print including a book, a magazine, and newspapers, to recognize a text, an illustration, and a photograph, indicated at the touched position on the print by touching and reading the XY coordinate value of the information input help sheet with a dot-pattern reading unit and converting the XY coordinate value into an xy coordinate value in a specified print information (for example, a DTP file) and search a variety of multimedia information, such as sound information and image information, corresponding to the recognized print information from an electronic dictionary or database where corresponding multimedia information is set in advance, and automatically output relevant information. Moreover, if a mask which specifies print information, such as a text, an illustration, and a photograph, as an XY coordinate value and multimedia information corresponding to the mask number are set in advance, the XY coordinate value in the dot pattern of the information input help sheet read by the dot-pattern reading unit can be used to search a multimedia information file and output relevant information. It should be noted that the recognized print information may be instruction of operation.

A twentieth aspect of the invention is a system for outputting print-related information using the information input help sheet according to the nineteenth aspect, wherein the information input help sheet is used to cover a print surface of a print, and an icon for inputting an index specifying the print surface of the print with the dot-pattern reading unit are superimposed and printed with a dot pattern.

According to this, as a user can use a dot-pattern reading unit to input information, such as the page number of a print, input of an index specifying the page number using a keyboard and the like is not required, which allows the system to be used more generally and to provide highly convenient and easy to use system.

It should be noted that the icon refers to are ion for causing recognition of a specific meaning with a text, an illustration or a symbol in a graphic such as a rectangular and a round.

A twenty-first aspect of the invention is the information processing system using the information input help sheet according to any one of the first to fifteenth aspects, wherein the information input help sheet is a medium processed into a sticker shape, a card shape, a bookmark shape, or a sticky note shape, and the system performs a variety of multimedia information output and/or operation instructions by reading a dot pattern on the medium by a dot-pattern reading unit.

According to this, it is possible to provide a system with excellent convenience and flexibility by processing the information input help sheet into a variety of forms.

A twenty-second aspect of the invention is the information input help sheet according to any one of the first to fifteenth aspects, wherein the information input help sheet is processed into a sticker shape, a card shape, a bookmark shape or a sticky note shape, which is used to perform a variety of multimedia information output and or operation instructions by reading a dot pattern on the medium by a dot-pattern reading unit.

According to this, it is possible to provide a system with excellent convenience and flexibility by processing the information input help sheet into a variety of forms.

A twenty-third of the invention is the information processing system using the information input help sheet according to any one of the first to fifteenth aspects, wherein the information input help sheet is disposed on display screens of a plurality of display units connected to one or more than one information processing devices, and the system enables touch-panel style input by reading a dot pattern on the information input help sheet disposed on the display screen on the display unit by a dot-pattern reading unit and secondarily inputs into the information processing device based on the dot pattern read out by the dot-pattern reading unit.

According to this, a thin client system can be provided using the information input help sheet. As for a plurality of displays to which a movie and an image are delivered from a server, a low cost input and output terminal which allows touch-panel style input can be realized by attaching the information input help sheet on a general television monitor or screen not incorporating a central processing unit. As a result, low cost and thin client style information processing system can be built.

A twenty-fourth aspect of the invention is the information processing system according to the twenty-third aspect, wherein connections between the information processing device and the plurality of display units are made by wired or wireless methods.

According to this, it is possible to choose whether a low-cost wired method or a convenient wireless method depending on the installation environment.

A twenty-fifth aspect of the invention is the information processing system according to the twenty-third or twenty-fourth aspect, wherein a connection between the information processing device and the dot-pattern reading unit is made by a wired or wireless method.

According to this, it is possible to choose whether a low-cost wired method or a convenient wireless method depending on the installation environment.

A twenty-sixth aspect of the invention is the information processing system according to any one of the twenty-third to twenty-fifth aspects, wherein the information input help sheet is printed with an XY coordinate value as well as a cord value that identifies each display unit as a dot pattern, the code value and XY coordinate value read out by a dot-pattern reading unit are transmitted to the information processing device in order to cause recognition of which display unit the values refer to and to enable touch-panel style input, and the information processing device recognizes a variety of multimedia information output and/or operation instructions corresponding to each display unit and displays output information on the display unit.

According to this, as the dot pattern includes a dot pattern of a combination of a coordinate value and a code value printed thereon, identifying a display and touch-panel style input processing can be simultaneously performed.

A twenty-seventh aspect of the invention is the information processing system according to any one of the twenty-third to twenty-fifth aspects, wherein the information input help sheet is printed with an XY coordinate that uniquely identifies a display unit, the XY coordinate value read out by a dot-pattern reading unit is transmitted to the information processing unit in order to cause identification of the display and to enable touch-panel style input, and the information processing device recognizes a variety of multimedia information output and/or operation instructions corresponding to each display unit and displays output information on the display unit.

According to this, as an information input help sheet on which is printed a dot pattern with a different XY coordinate value is placed on each display unit, the display unit can be identified only by the XY coordinate value.

A twenty-eighth aspect of the invention is the information processing system according to any one of the twenty-third to twenty-fifth aspects, wherein a sticker printed with a dot pattern of a code value that identifies each display unit is attached on a chassis of the display unit, the code value read out by a dot-pattern reading unit is transmitted to the information processing device in order to cause recognition of which display unit the value refers to and to enable touch-panel style input, and the information processing device recognizes a variety of multimedia information output and/or operation instructions corresponding to each display unit and displays output information on the display unit.

According to this, as a sticker identifies a display unit, the display unit can be identified using the same information input help sheet.

It should be noted that the sticker printed with a dot pattern may be printed on anywhere including an information input help sheet or a display chassis.

A twenty-ninth aspect of the invention is a calibration method for using an information input help sheet that is disposed on a print surface of as print or a display screen of a display unit, and on which is provided a dot pattern to be read by an optical reading unit in order to output information relating to an image of the print or a display of the display unit, wherein the information input help sheet is used by being disposed on the display screen of the display unit, a calibration mark is provided on two or more corners and/or a center of one side of the information input help sheet, and a coordinate system of the display unit and a coordinate system of the information input help sheet are properly related by moving and adjusting a cursor to the mark.

According to this, it is possible to perform an accurate calibration in the resolution of a display unit, by moving and adjusting a cursor to the mark disposed on the information input help sheet, which thereafter prevents coordinate misalignment between input by a dot-pattern reading unit onto the information input help sheet and processing to the image on the display unit.

A thirtieth aspect of the invention is the calibration method according to the twenty-ninth aspect, wherein the calibration mark is formed on a detachable transparent sticker, and the sticker is peeled off from the information input help sheet after the calibration is completed.

According to this, the calibration marks on the information input help sheet can be removed after the calibration, which can prevent from impairing the screen display of the display unit.

A thirty-first aspect of the invention is the calibration method according to the twenty-ninth aspect, wherein the calibration mark is provided on the information input help sheet in a state in which the mark is removable, and the mark is removed from the information input help sheet after the calibration is completed.

A thirty-second aspect of the invention is the information input help sheet used in the calibration according to any one of the twenty-ninth to thirty-first aspects.

A thirty-third aspect of the invention is a calibration method for using an information input help sheet that is disposed on a prim surface of a print or a display screen of a display unit, and on which is provided a dot pattern to be read by an optical reading unit in order to output information relating to an image of the print or a display of the display unit, wherein the information input help sheet is used by being disposed on the display screen of the display unit, a calibration mark is displayed at least temporally on two or more corners and/or a center of the display unit, and calibration is performed to properly relate a coordinate system of the display unit and a coordinate system of the information input help sheet by adjusting the dot-pattern reading unit to the mark and reading the dot pattern on the information input help sheet.

According to this, the information input help sheet is not required to be printed with a calibration mark, which enables easier calibration.

A thirty-fourth aspect of the invention is a calibration method for using an information input help sheet that is disposed on a print surface of a print or a display screen of a display unit, and on which is provided a dot pattern to be read by an optical reading unit in order to output information relating to an image of the print or a display of the display unit, wherein the information input help sheet is used to cover the print surface of the print, a calibration mark is printed on two or more corners of the information input help sheet and the print, and a coordinate system of the print and a coordinate system of the information input help sheet are properly related by adjusting the calibration marks of both of the information input help sheet and the print.

According to this, calibration may be done easily by human eyes to prevent, thereafter, coordinate misalignment between input by a scanner onto the information input help sheet and processing to an image on a print.

A thirty-fifth aspect of the invention is the information input help sheet used for the calibration according to the thirty-fourth aspect.

A thirty-sixth aspect of the invention is a calibration method for using an information input help sheet that is disposed on a print surface of a print or a display screen of a display unit, and on which is provided a dot pattern to be read by an optical reading unit in order to output information relating to an image of the print or a display of the display unit, wherein the information input help sheet is used to cover the print surface of the print, a calibration mark is printed on two or more corners of the print, and a coordinate system of the print and a coordinate system of the information input help sheet are properly related by adjusting the dot-pattern reading unit to the mark and reading the dot pattern on the information input help sheet.

According to this, since calibration marks only need to be printed on a print and are not required to be printed on the information input help sheet, the information input help sheet may be versatile.

According to this, a device equipped with any display unit including a general computer, a PDA, and a mobile phone may be very easily used as touch-panel style input means.

Further, the information input help sheet can be mounted on a print, such as a book and a catalog, or any other media, which enables outputting of multimedia information including a text, an illustration, a photograph, a sound, and a movie relating to a part of a medium and performing of operation, without printing any code on the medium itself.

BRIEF DESCRIPTION OF THE DRAWINGS

FIGS. 10A to 10C are an example of an information dot in GRID1 and bit expression of data defined therein; FIG. 10A arranges two dots; FIG. 10B arranges four dots; and FIG. 10C arranges five dots.

FIGS. 11A to 11D show modification examples of a dot pattern in GRID1; FIG. 11A is a schematic diagram of six information dot arrangement; FIG. 11B is a schematic diagram of nine information dot arrangement; and FIG. 11C is a schematic diagram of 12 information dot arrangement; and FIG. 11D is a schematic diagram of 36 information dot arrangement.

FIGS. 12A to 12C are explanatory diagrams showing dot patterns of direction dot.

FIGS. 17A to 17C are diagrams showing a system for displaying information on a display unit by touching on a grid sheet by a user.

DESCRIPTION OF NUMERALS AND SIGNS

DOT PATTERN
KEY DOT
INFORMATION DOT
REFERENCE GRID POINT DOT
VIRTUAL GRID POINT
48a, 48b, 48c, 48d, 48e REFERENCE DOT
48f, 48g. 48h VIRTUAL REFERENCE POINT

DETAILED DESCRIPTION OF THE INVENTION

Figure 1:
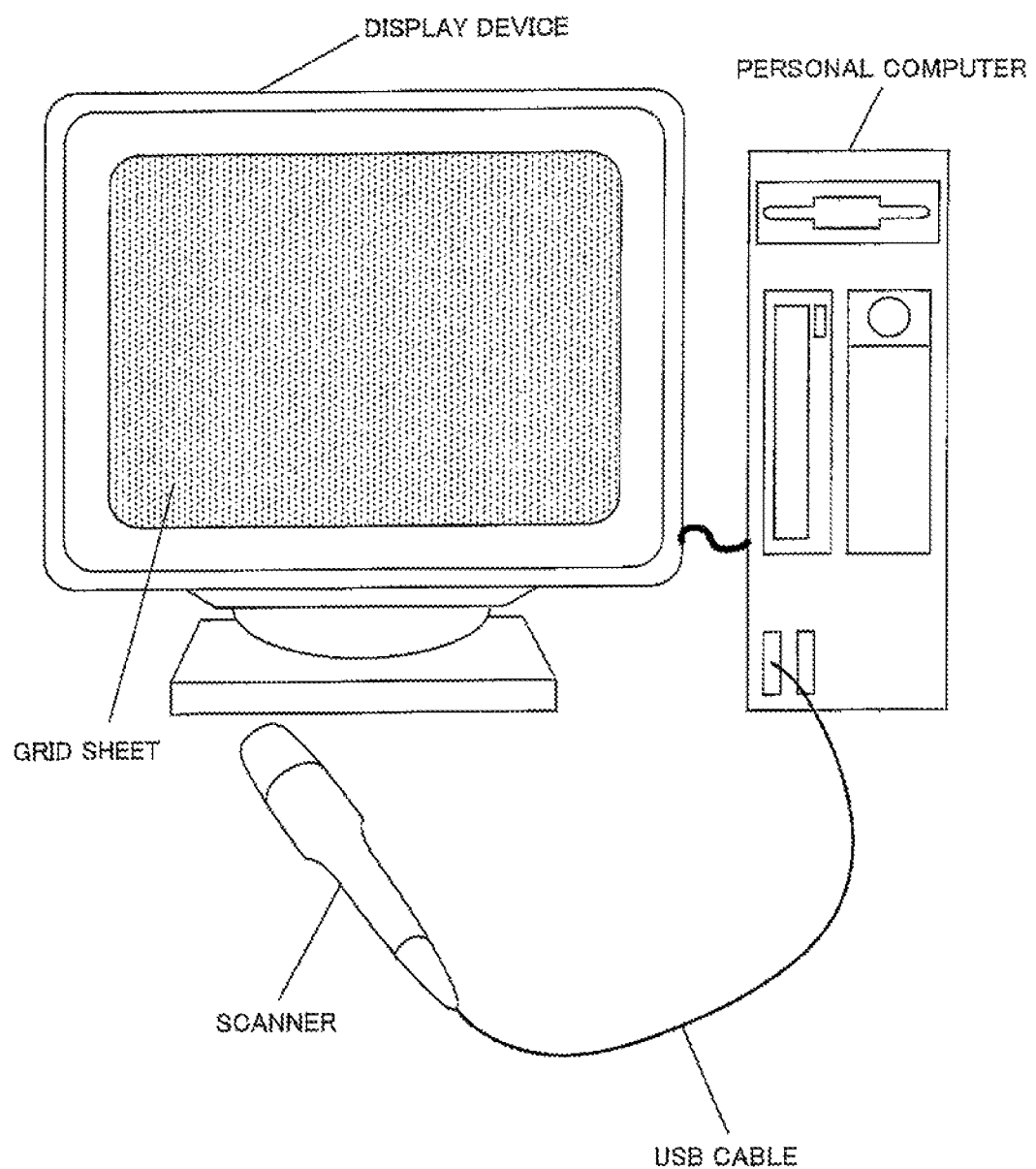
FIG. 1 is a drawing using a grid sheet of the invention (information input help sheet) in a general computer system as an information processing device.
Figure 2A:
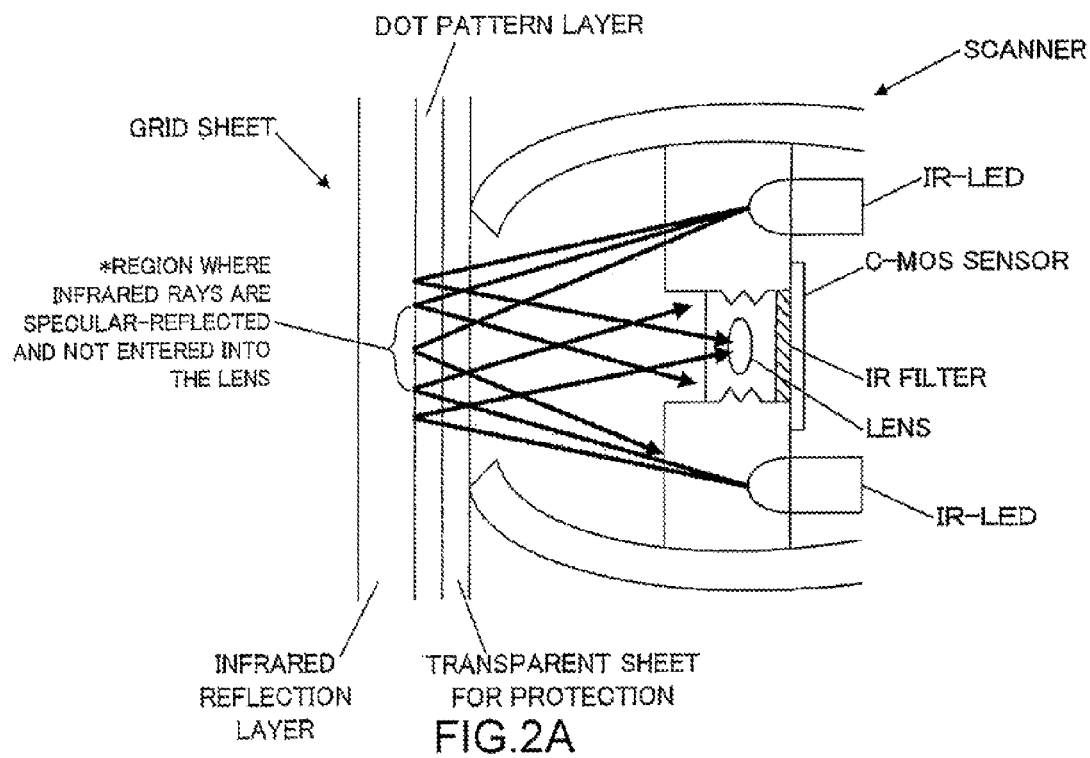
FIGS. 2A and 2B are sectional views (1) illustrating diffuse reflection.
Figure 2B:
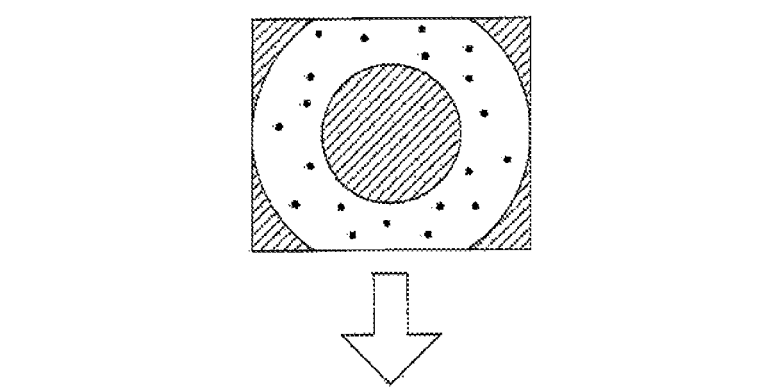

FIGS. 1 to 2B are explanatory diagrams showing an embodiment of a grid sheet as the information input help sheet of the invention used by being attached on a display unit.

FIG. 1 is a diagram in which a grid sheet is used with a general computer system of an information processing device. In this embodiment, the grid sheet is attached on a display screen such as a liquid crystal display (LCD) or CRT (cathode ray tube) of a personal computer or the like. The grid sheet is formed as a transparent film and printed with a dot pattern. This dot pattern, although the details are described later, is made into a pattern with an XY coordinate value and/or a code value based on a predetermined algorithm. A scanner as a dot-pattern reading unit is connected to the computer body. A user touches a grid sheet with the scanner in accordance with the instruction on the screen seen through the grid sheet. The scanner reads the dot pattern and transmits the information to a personal computer through a USB cable; the central processing unit (CPU) of the personal computer analyzes a dot pattern, calculates an XY coordinate value on the grid sheet, and further converts the coordinate value to an xy coordinates value on the display unit. As a result a touch panel style input using the coordinate value information is made possible.

According to this, this sheet makes possible the touch-panel style input, which can provide low cost and highly convenient touch panel. Also, even information for which link information is not set, can be referred to by searching relevant information, while browsing an Internet site.

It should be noted that, although a personal computer is used as an information processing unit in FIG. 1, the invention is not limited to this the information processing unit may be a personal computer, a PDA, a television receiver, a front or rear projector, a game machine, a karaoke device, a mobile phone terminal, a PUS terminal, an ATM, a KIOSK terminal, a car navigation system, a pachinko, a watch, a smart phone, or the like. For such devices, a grid sheet as a touch panel style input device is disposed on the display screen of a display unit or a screen.

FIGS. 2A and 2B are sectional views showing the internal structure of the grid sheet described in FIG. 1.

FIG. 2A is a longitudinal sectional view showing a state where a grid sheet is touched by a scanner.

As shown in FIG. 2A, the grid sheet has a layered structure where an infrared reflection layer, a dot pattern layer, a transparent sheet for protection (a protection layer) are layered in the order from the display unit side.

The infrared reflection layer has a structure where a transparent evaporation sheet made from material that transmits visible light, such as vinyl, polyvinyl chloride, polyethylene terephthalate, and polypropylene, is deposited with infrared reflecting material. The infrared reflection layer reflects, to the scanner, infrared rays that was irradiated from the infrared irradiation unit of a scanner and transmitted through the transparent sheet for protection, as well as transmits visible light. At the same time, the infrared reflection layer blocks infrared rays from the display unit. In this way, as infrared light irradiated from the infrared irradiation unit of the scanner can be the only irradiation light, only a bright and clear dot pattern can be imaged and the dot code can be accurately analyzed.

The dot pattern layer is printed with a dot pattern where dots made from material having an infrared absorbing characteristic, such as carbon ink, are arranged in accordance with a predetermined rule that is described later.

The transparent sheet for protection is made from material which transmits visible light and infrared rays, such as vinyl, polyvinyl chloride, polyethylene terephthalate, and polypropylene. If a dot pattern is repeatedly touched by a scanner, the dots are worn away, and a problem occur such that the dot pattern cannot be accurately read. By providing a transparent sheet for protection, the dots are prevented from wearing and dirt, and the sheet can have a longer use period.

The scanner is embedded with an IR-LED as an infrared irradiation unit, an IR filter for blocking a predetermined wave-length component of the reflection light, a C-MOS sensor as an imaging element, and a lens. The scanner captures reflection light of the irradiation light irradiated on a grid sheet. As described above, as the dot pattern is printed with ink having an infrared absorbing characteristic, only dot part is imaged as black in the image captured by the C-MOS sensor.

Figure 3A:
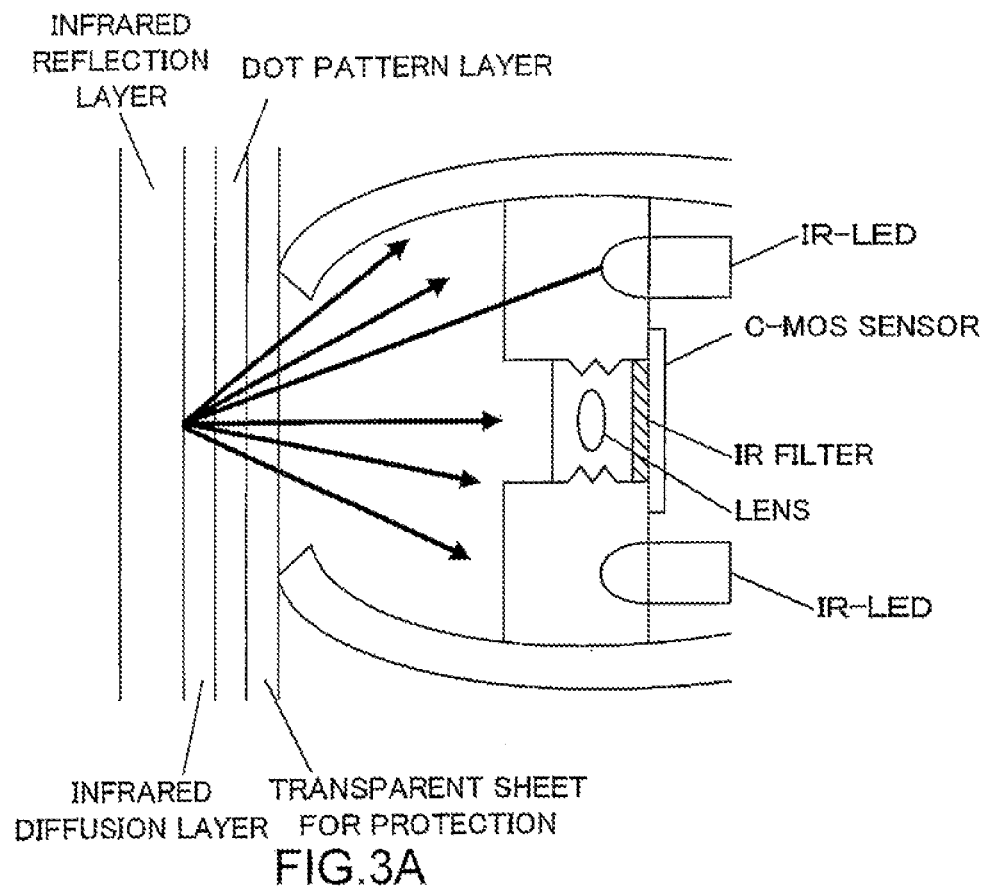
FIGS. 3A and 3B are sectional views (2) illustrating diffuse reflection.

As it is, the reflection layer that was specular-reflected from the infrared reflection layer does not enter into the lens and is imaged as black in the middle, as shown in FIG. 2B. As a result, the whole dot pattern cannot be imaged completely, and, thus, the infrared rays should be diffusely reflected before entered into the lens. That is, as shown in FIG. 3A, an infrared diffusion layer should be provided between the dot pattern printed layer and the infrared reflection layer. This infrared diffusion layer is made from transparent or translucent material. In this way, as shown in FIG. 3B, infrared rays irradiated from the IR-LED is specular-reflected from the infrared reflection layer and diffused by the infrared diffusion layer, and reflected light from the whole imaging area enters into the lens.

Figure 3B:
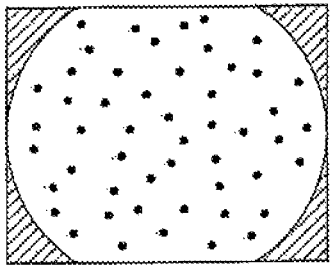

It should be noted that, although, in FIGS. 3A and 3B, an infrared diffusion layer is provided, on a grid sheet, the invention is not limited to this, and a filter made from infrared diffusing material may be provided on the imaging opening of the scanner.

FIGS. 4A to 4G are sectional views showing a variety of grid sheet structures.

Figure 4A:
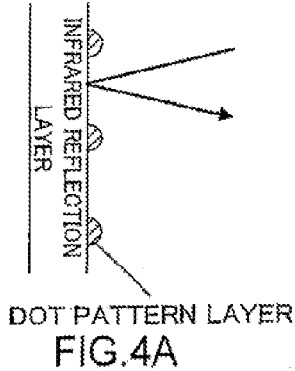
FIGS. 4A to 4G are sectional views showing a variety of grid sheet structures.

FIG. 4A is a grid sheet composed of an infrared reflection layer that has a characteristic to reflect infrared rays and transmit visible light and a dot pattern layer. As shown in FIG. 4A, infrared rays irradiated from the infrared irradiation unit are absorbed into a part where dots of the dot pattern layer are formed (hereafter, referred to as dot part), but are transmitted through other regions. Then, the transmitted infrared rays are specular-reflected from the infrared reflection layer and transmitted through the dot pattern layer other than the dot part.

Figure 4B:
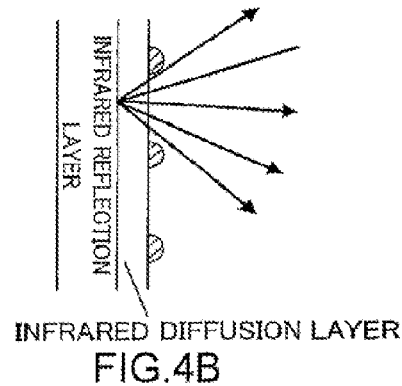

FIG. 4B is a grid sheet provided, between an infrared reflection layer and a dot pattern layer, with an infrared diffusion layer that transmits visible light as well as diffuses the infrared rays. As shown in FIG. 4B, the infrared rays irradiated from the infrared irradiation unit are absorbed in the dot part of the dot pattern layer, and transmitted through other regions. Then, the transmitted infrared rays are diffused by the infrared diffusion layer, specular-reflected by the infrared reflection layer, again, diffused by the infrared diffusion layer, and transmitted through the dot pattern layer other than the dot part.

Figure 4C:
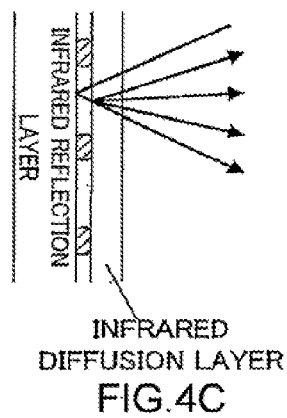

FIG. 4C is a grid sheet provided, on one side of a dot pattern layer, that is, the opposite side of an infrared reflection layer, with an infrared diffusion layer that transmits visible light as well as diffuses infrared light. As shown in FIG. 4C, infrared rays irradiated from the infrared irradiation unit are diffused by the infrared diffusion layer, absorbed in the dot part of the dot pattern layer, and transmitted through other regions. Then, transmitted infrared rays are specular-reflected by the infrared reflection layer, again, transmitted through the dot pattern layer other than the dot part, and diffused by the infrared diffusion layer.

Figure 4D:
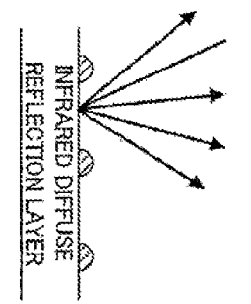

FIG. 4D is a grid sheet composed of a dot pattern layer and an infrared diffuse reflection layer that has a characteristic to diffusely reflect infrared rays from one side and transmit visible light. As shown in FIG. 4D, infrared rays irradiated from the infrared irradiation unit are, first, absorbed in the dot part of the dot pattern layer and transmitted through other regions. Then, the transmitted infrared rays are diffuse-reflected by the infrared diffuse reflection layer, and transmitted through the dot pattern layer other than the dot part.

Figure 4E:
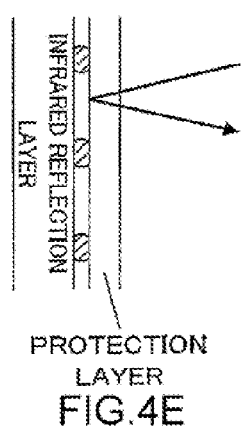

FIG. 4E is a grid sheet provided with a protection layer that has a characteristic to transmit infrared tight and visible light on the external surface of the dot pattern layer side of the grid sheet shown in FIG. 4A. Having such a protection layer, the dots are prevented from wearing and dirt and the sheet can have a longer use period.

It should be noted that the protection layer may be provided on the external surface of the dot pattern layer side of the grid sheet shown in FIGS. 4B to 4D.

Figure 4F:
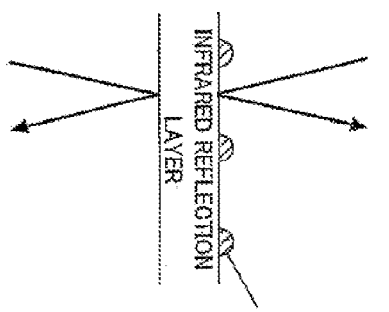

FIG. 4F is a grid sheet which also has a characteristic to reflect infrared rays from the opposite side of the dot pattern layer in the grid sheet shown in FIG. 4A. Having such a characteristic, infrared rays from a display screen or a screen on which the and sheet of the invention is attached can be blocked and infrared light irradiated from the infrared irradiation unit can be the only irradiation light. Thus, only bright and clear dot pattern can be imaged and the dot code can be accurately analyzed.

It should be noted that, the grid sheets, not only the one in FIG. 4A but also the ones shown in FIGS. 4B to 4E, may have a characteristic to reflect infrared rays from the opposite side of (the surface other than) the dot pattern layer.

Figure 4G:
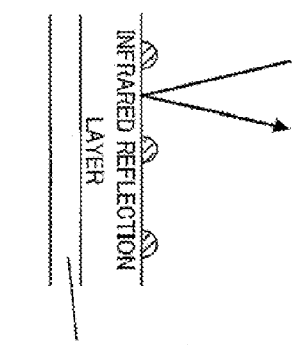

FIG. 4G is a grid sheet provided with an adhesive layer on a side not facing the dot pattern layer of the infrared reflection layer in the grid sheet shown in FIG. 4A. The adhesive layer is made from material which makes the layer detachable. The adhesive layer is required only when the grid sheet is used by being attached on a display unit or a medium, and not required when, as described later, used by being placed on or sandwiched by a print. Having such an adhesive layer, the grid sheet can be easily attached on a display unit, etc.

It should be noted that the adhesive layer may be provided on a side not facing the dot pattern layer of the infrared reflection layer of the grid sheet, not only in the grid sheet in FIG. 4A but also the ones shown in FIGS. 4B to 4E.

FIGS. 5A to 5F show another embodiment of the grid sheet. This embodiment features the dot pattern layers provided both sides of a sheet.

Figure 5A:
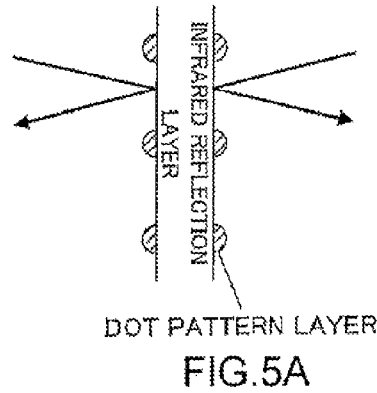
FIGS. 5A to 5F are sectional views showing structures of grid sheets with dot pattern layers provided on both sides.

FIG. 5A is a grid sheet composed of an infrared reflection layer that has a characteristic to reflect infrared rays irradiated on each surface to each direction and transmit visible light and a dot pattern layer provided on both sides of the infrared reflection layer. According to this, both sides of the sheet can be used, enhancing convenience.

Figure 5B:
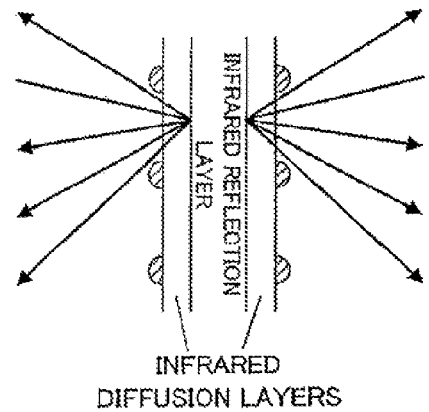

FIG. 5B is a grid sheet provided with an infrared diffusion layer, between an infrared layer and a dot pattern layer on each side, that transmits visible light and diffuses infrared light from each direction.

Figure 5C:
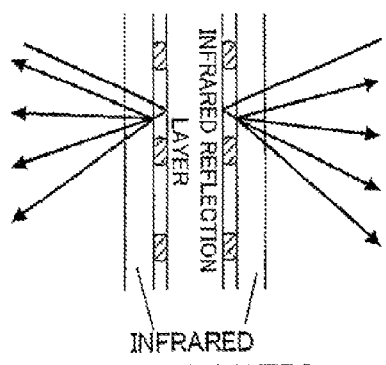

FIG. 5C is a grid sheet provided with an infrared reflection layer and an infrared diffusion layer on an external surface of the dot pattern layer of each side of the infrared reflection layer.

Figure 5D:
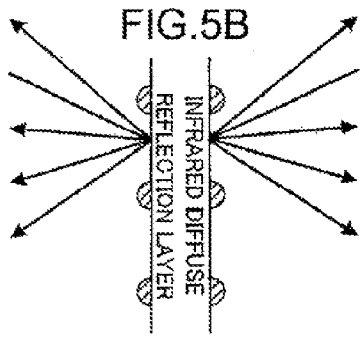

FIG. 5D is a grid sheet composed of an infrared diffuse reflection layer and dot pattern layers provided on both sides of the infrared diffuse reflection layer.

Figure 5E:
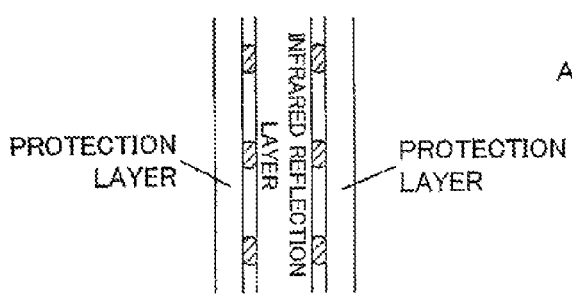

FIG. 5E is an information input help sheet where both external sides of a grid sheet shown in FIG. 5A are provided with protection layers having a characteristic to transmit infrared, light and visible light from each direction.

It should be noted that the protection layer may be provided not only on the both external sides of a grid sheet in FIG. 5A but also on the both external sides of the ones shown in FIGS. 5B to 5D.

Figure 5F:
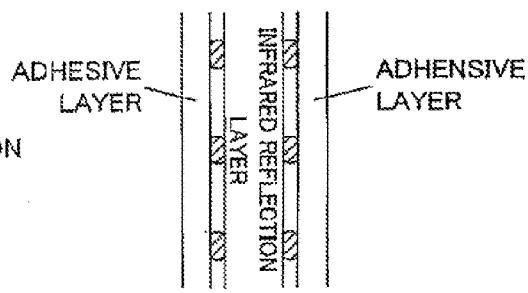

FIG. 5F is a grid sheet 5A where, in a grid sheet shown in FIG. 5A, adhesive layers are provided on each side not facing the dot pattern layer of the infrared reflection layer, that is, on both external sides of the grid sheet.

It should be noted that the adhesive layer may be provided not only on both external sides of the grid sheet in FIG. 5A but also on both external sides of the ones shown in FIGS. 5B to 5E.

Descriptions on each layer and reflection of grid sheets in FIGS. 5A to 5F are the same as described above, so the descriptions are omitted here.

It should be noted that, in grid sheets shown in FIGS. 5A to 5F, different coordinate values and/or code values may be made into patterns between a do pattern layer on one side and a dot-pattern layer on the other side of the infrared reflection layer or infrared diffuse reflection layer.

Also, in grid sheets shown in FIGS. 4A to 5F, a text, an illustration, a photograph, or the like may be superimposed and printed on the dot pattern layer or other layers, with ink of infrared transmitting material or infrared reflecting material.

<Description of a Dot Pattern>

Dot patterns printed on such an information input help sheet are now described with reference to FIGS. 6 to 12C.

<Description of a Dot Pattern GRID1>

FIGS. 6 to 11D are explanatory diagrams showing GRID1 as an example of a dot pattern of the invention.

It should be noted that in these diagrams, grid lines in horizontal and vertical directions are added for convenience of description, and do not exist in an actual printing surface. If a scanner as an imaging unit has an infrared irradiation means, a key dot 2, an information dot 3, a reference grid point dot 4 and the like constituting a dot pattern 1, are preferably pouted with an invisible ink or a carbon ink, which absorbs the infrared light.

Figure 6:
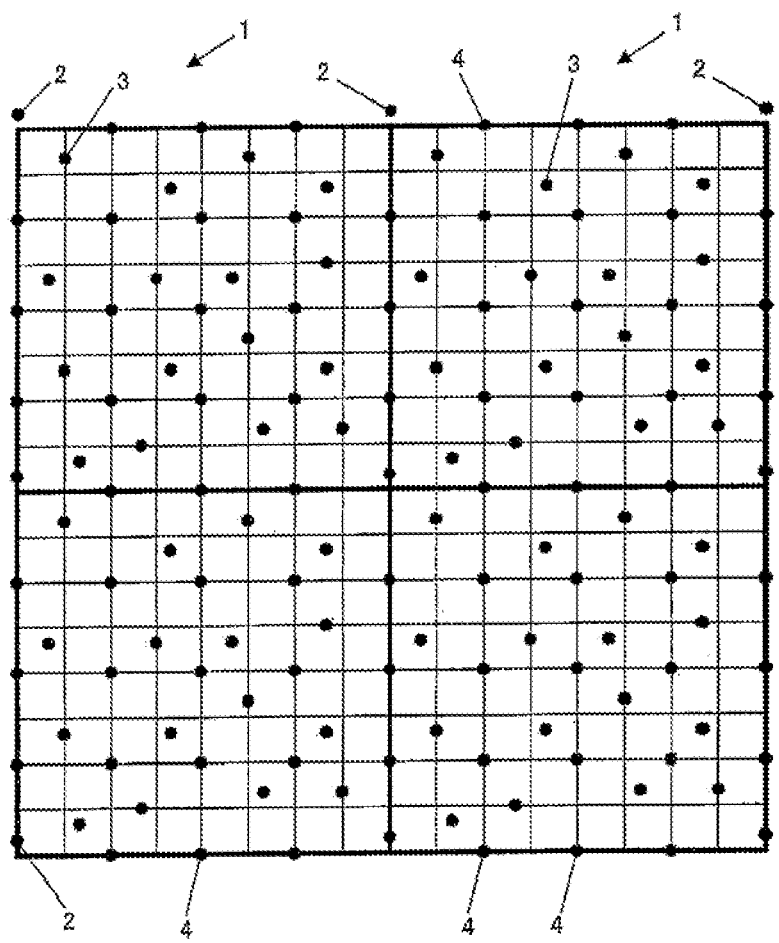
FIG. 6 is an explanatory diagram showing an example of a dot pattern of GRID1.
Figure 7A:
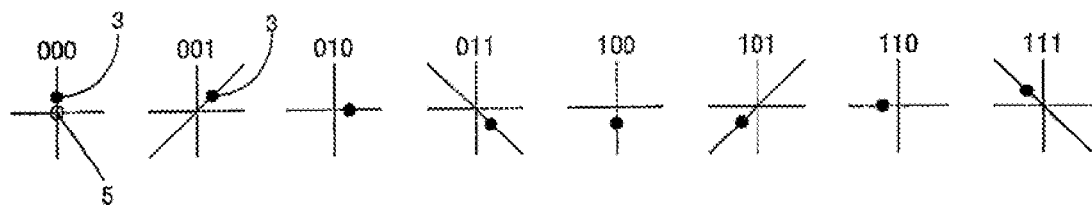
FIGS. 7A and 7B are enlarged views showing an example of an information dot of a dot pattern in GRID1.
Figure 7B:
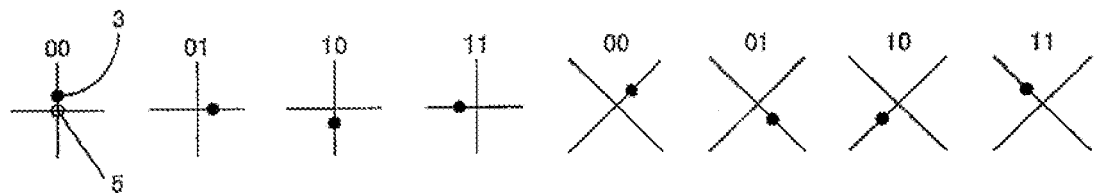

FIG. 6 is an enlarged view showing an example of information dots of a dot pattern and bit expression of data defined therein. FIGS. 7A and 7B are explanatory diagrams showing information dots arranged with key dots located in the centers.

The information input and output method using a dot pattern of the present invention comprises means for generating a dot pattern 1, means for recognizing the dot pattern 1, and means for outputting information and a program from the dot pattern 1. That is, after retrieving a dot pattern 1 as image data with a camera, first, the method extracts a reference grid point dot 4, then, extracts a key dot 2 based on the fact that there is no dot at the location where a reference grid point dot 4 supposed to be, extracts an information dot 3, digitizes the information dot 3 to extract an information region, converts the information into numerical values, and outputs information and a program from this dot pattern 1 based on the numerical information. For example, the method outputs information such as a sound and a program from this dot pattern 1 to an information output device, a personal computer, a PDA, a mobile phone, or the like.

To generate a dot pattern 1 of the present invention, based on a dot code generation algorithm, fine dots, used for recognition of numerical information, including key dots 2, information dots 3, and reference grid point dots 4, are arranged in accordance with a predetermined rule. As shown in FIG. 6, in a block of a dot pattern which represents information, 5×5 reference grid point dots 4 are arranged with reference to a key dot 2, and an information dot 3 is arranged around a virtual grid point which is at the center surrounded by the four reference grid point dots 4. Arbitrary numerical information is defined in this block. The illustrative example of FIG. 6 shows a case where four blocks of a dot pattern 1 are arranged in parallel (in bold frame), provided, however, that the dot pattern 1 is not limited to four blocks.

When a camera retrieves this dot pattern 1 as image data, reference grid point dots 4 can calibrate a distortion of a lens of the camera, skewed imaging, expansion and contraction of a paper surface, curved medium surface and distortion during printing. Specifically, a function for calibration (Xn, Yn)=f (Xn', Yn') is calculated for converting distorted four reference grid points 4 into the original square, then the vector of the correct information dot 3 is calculated by calibrating an information dot 3 by the same function.

If reference grid point dots 4 are arranged in a dot pattern 1, since image data of the dot pattern 1 retrieved by a camera can be calibrated its distortion attributable to the camera, image data of the dot pattern 1 can be accurately recognized even when the image data is retrieved by a popular camera with a lens of high distortion rate. Moreover, even when the dot pattern 1 is read out by a camera inclined with reference to a surface of the dot pattern 1, the dot pattern 1 can be accurately recognized.

Key dots 2 are dots, as shown in FIG. 6, arranged by shifting four reference grid point dots 4 that are located at the four corners of a block, in a certain direction. The key dot 2 is a representative point of a block of a dot patient 1 which represents an information dot 3. For example, the key dots are dots obtained by shifting reference grid point dots 4 that are located at the four corners of a block of a dot pattern 1 by 0.1 mm upward. However these numbers are not limited to these, and may vary depending on the size of a block of a dot pattern 1.

Information dots 3 are dots used for recognition of a variety of information. The information dot 3 is arranged around a key dot 2 as a representative point, as well as at the ending point of a vector expressed with a starting point being a virtual grid point 5 that is at the center surrounded by four reference grid point dots 4. For example, the information dot 3 is surrounded by reference grid point dots 4 and, as shown in FIG. 7A, since the dot 0.1 mm apart from the reference grid point 5 has direction and length when expressed as a vector, the information dots 3 expresses 3 bits by being disposed in eight directions by being rotated by 45 degrees each in clockwise direction. As a result, one block of a dot pattern 1 can express 3 bits×16=48 bits.

FIG. 7B is a method for defining an information dot 3 having 2 bits or each grid, in a dot pattern of FIG. 6. Each grid defines information of 2 bits by shifting a dot in + direction and × direction. In this way, although 48 bits information can be defined indeed, data can be allocated to each 32 bits by dividing for an intended purpose. Maximum of 216 (approximately 65,000) patterns of dot pattern formats can be realized depending on the combination of + direction and × direction.

It should be noted that arrangement is not limited to this and may vary including a possibility of 4 bit expression by arranging dots in 16 directions.

Preferably, the dot diameter of a key dot 2, information dot 3, or reference grid point dot 4 is approximately 0.05 mm in consideration of viewing quality, printing accuracy in respect of a paper property, resolution of a camera, and optimal digitization.

Also, the gap between reference grid point dots 4 is preferably approximately 0.5 mm in both vertical and horizontal directions in consideration of information amount required for an imaging area and possible false recognition of dots 2, 3, and 4. In consideration of false recognition of reference grid point dots 4 and information dots 3, disalignment of a key dot 2 is preferably around 20% of the grid gap.

The gap between the information dot 3 and a virtual grid point that is surrounded by four reference grid point dots 4 is preferably the gap approximately 15 to 30% of a distance between adjacent virtual grid points 5. If the distance between an information dot 3 and a virtual grid point 5 is shorter than this gap, dots are easily recognized as a big cluster, degrading the visual quality as a dot pattern 1. On the other hand, if the distance between an information dot 3 and a virtual grid point 5 is longer than this gap, the judgment as to which one of the adjacent virtual grid point 5 is the center of a vector of the information dot 3 becomes difficult.

As shown in FIG. 6, one dot pattern is a dot pattern composed of 4×4 block regions, and an information dot 3 of 2 bits is disposed in each block. The dot-code format of this information dot 3 is shown in FIG. 8.

Figures 8, 9:
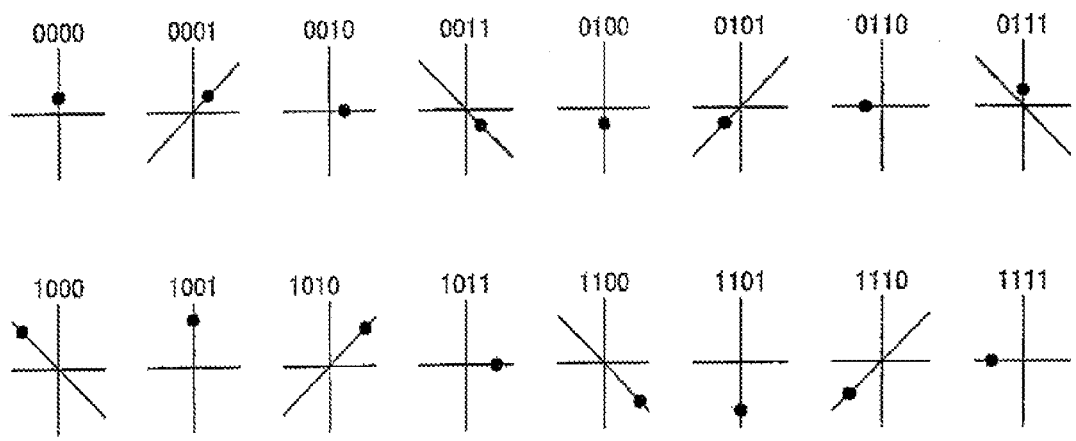
FIG. 8 is an explanatory diagram showing a dot pattern format in GRID1.
FIG. 9 is an example of an information dot in GRIM and bit expression of data defined therein, showing another embodiment.

As shown in FIG. 8, one dot pattern registers a parity check, a code value, an X coordinate, and a Y coordinate.

FIG. 9 is an example of information dot 3 and bit expression of the data defined therein, and shows another embodiment.

Information dots 3 can express 4 bits if two types of information dots, long and short distance ones from a virtual grid point 5 that is surrounded by reference grid point dots 4, are used, and vector directions are eight directions. Here, the long distance of the information dots 3 is preferably approximately 25 to 30% of the distance between adjacent virtual grid points 5, and the short distance, approximately 15 to 20%. However, the gap between the centers of the long and short distance information dots 3 is preferably longer than the diameters of these dots.

The information dot 3 surrounded by four reference grid point dots 4 is preferably one dot in consideration of visual quality. However, if the visual quality is disregarded and information amount is required to be large, one bit can be allocated to each vector and information dot 3 can be expressed by a plurality of dots thereby expressing a great amount of information. For example, with vectors of 8 concentric directions, an information dot 3 surrounded by four grid dots 4 can express 28 pieces of information 16 information dots in one block accounts for 2128 pieces of information.

FIGS. 10A to 10C are examples of information dots and bit expressions of data defined therein. FIG. 10A is a diagram disposing two dots; FIG. 10B is a diagram disposing four dots; and FIG. 10C is a diagram disposing five dots.

FIGS. 11A to 11D show modification examples of a dot pattern. FIG. 11A is a schematic diagram of six information dot arrangement. FIG. 11B is a schematic diagram of nine information dot arrangement; FIG. 11C is a schematic diagram of 12 information dot arrangement, and FIG. 11D is a schematic diagram of 36 information dot arrangement.

The dot pattern 1 shown in FIG. 6 shows an example where 16 (4×4) information dots 3 are arranged in one block. However, this information dot 3 is not limited to disposing of 16 dots and may vary. For example, depending on the required information size and the resolution of a camera, 6 (2×3) information dots 3 may be arranged in one block (FIG. 11A), 9 (3×3) information dots 3 may be arranged in one block (FIG. 11B), 12 (3×4) information dots 3 may be arranged in one block (FIG. 11C), and 36 information dots 3 may be arranged in one block (FIG. 11D).

<Description of a Dot Pattern; Direction Dot>

Next, another embodiment of a dot pattern, a direction dot, is described with reference to FIGS. 12A to 12C.

This dot pattern defines the dot pattern's direction by the shape of its block. In FIG. 12A, reference points 48a to 48e are first arranged, and the line which connects these reference points 48a to 48e defines a shape showing the direction of the block (a pentagon oriented upward in this example). Based on these reference points, virtual reference points 48f, 48g, and 48h are arranged. An information dot 3 is disposed at the ending point of a vector which has a length and a direction when having the virtual reference point as the starting point. In this way, the direction of a block can be defined by how reference points are arranged, in FIG. 11A. In addition, the whole size of a block is also defined by the direction dot defining the orientation of the block.

It should be noted that although the reference points 48a to 48e and information dot 3 were described as being the same shapes in FIG. 12A, reference points 48a to 48e may be larger than an information dot 3. Further, these reference points 48a to 48e ma take any shapes including an triangle, a square, or other polygons, as long as they can be distinguished from an information dot 3.

FIG. 12B defines information according to the fact whether or not a information dot exists on a virtual grid point of a block.

In FIG. 12C, two of the block shown in FIG. 12A are coupled, in horizontal and vertical directions respectively.

FIGS. 13A to 18 are diagrams illustrating another embodiment of the invention. This embodiment uses the grid sheet by placing the sheet on a print.

Figure 13A:
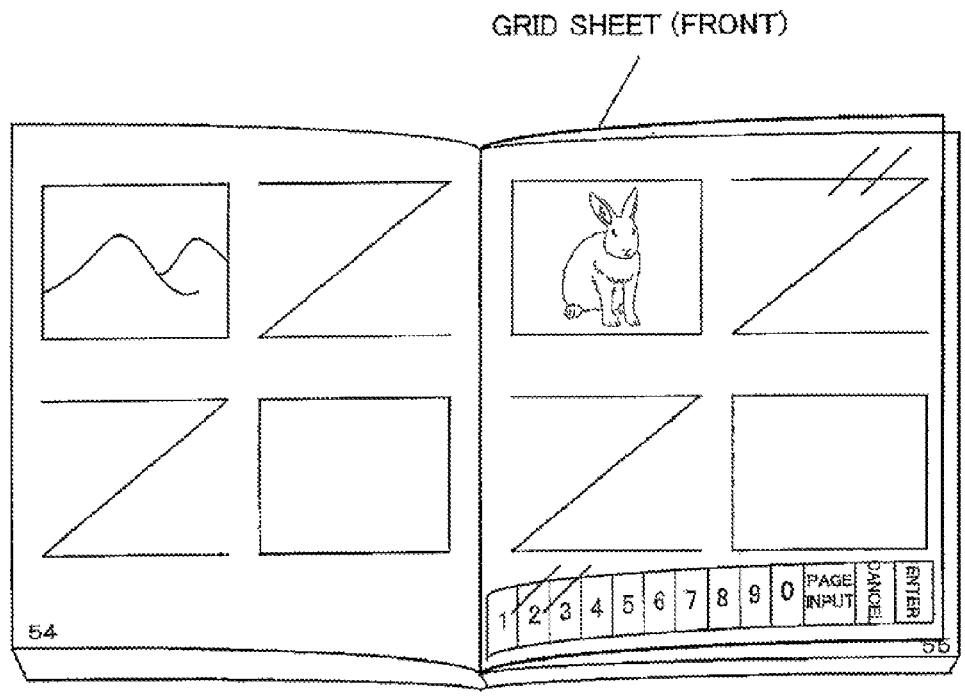
FIGS. 13A and 13B are diagrams showing an illustrative example using a grid sheet, having a dot pattern layer only on one side, with a print.
Figure 13B:
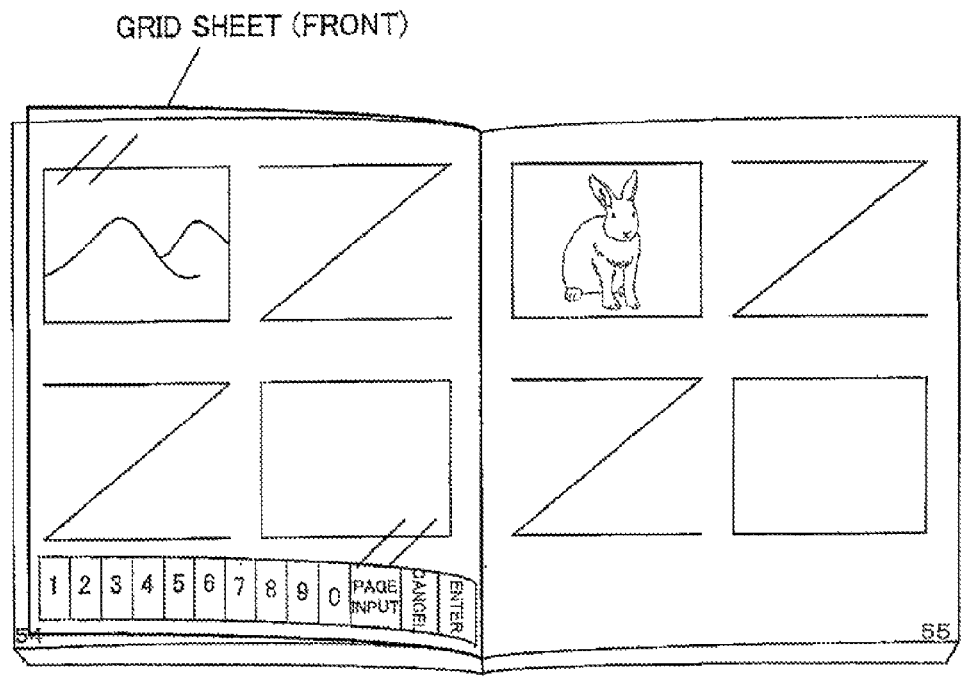

FIGS. 13A and 13B are diagrams showing a case using a grid sheet printed with a dot pattern only on one side.

A user uses the grid sheet by covering a print, such as a book, a magazine, and a new paper, with the grid sheet. The user should use the sheet with the front side facing upward, whether using the sheet for the page at the user's right as shown in FIG. 13A, or using the sheet for the page at the use's left as shown in FIG. 13B.

Figure 14A:
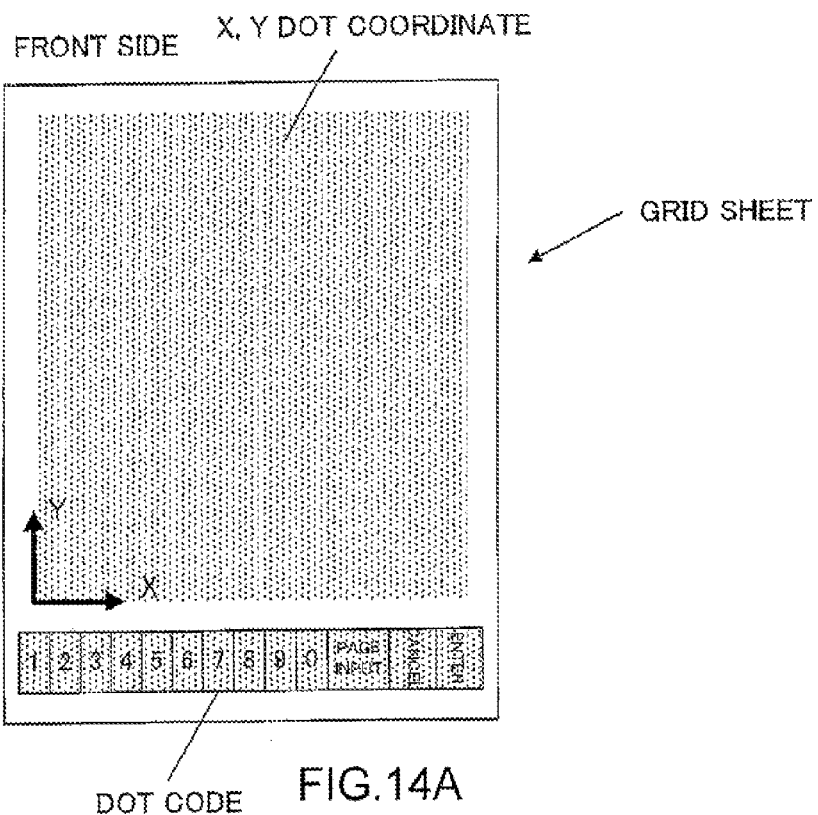
FIGS. 14A and 14B are a front view and a sectional view of a grid sheet used in FIGS. 13A and 13B.

FIG. 14A is a front view showing the front side of a grid sheet. The grid sheet is printed with a dot pattern signifying XY coordinate over the entire surface. In the bottom of the grid sheet, icons indicating numbers from zero to nine and texts of "Page Input," "Enter," and "Cancel," are superimposed and printed with dot patterns signifying code values. These icons are icons for inputting indexes that specify prints by a scanner.

Figure 14B:
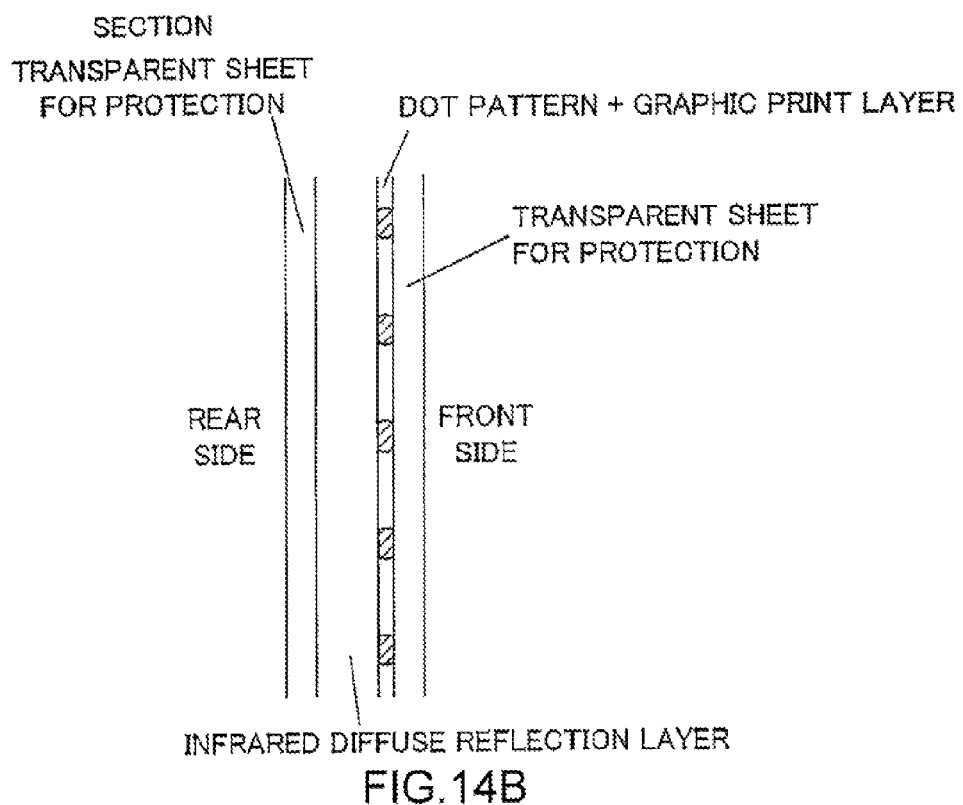

FIG. 14B is a longitudinal sectional view of the grid sheet. This grid sheet is composed of layers of a transparent sheet for protection, a transparent infrared diffuse reflection layer, a dot pattern+graphic print layer, and a transparent sheet for protection in the order from the rear side. Here, the graphic print layer is a visible print layer.

Figure 15A:
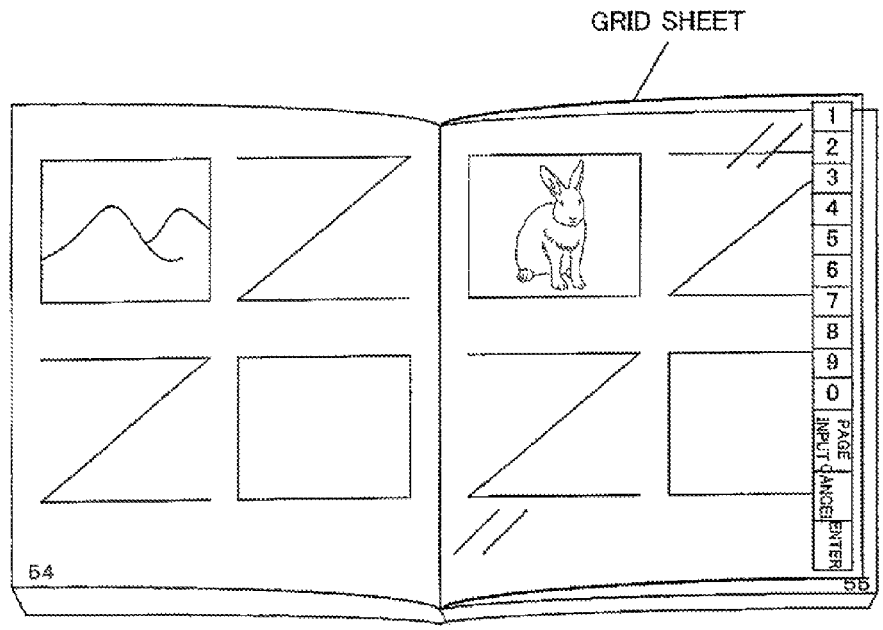
FIGS. 15A and 15B are diagrams showing an illustrative example of using a grid sheet having dot pattern layers on both sides for a print.
Figure 15B:
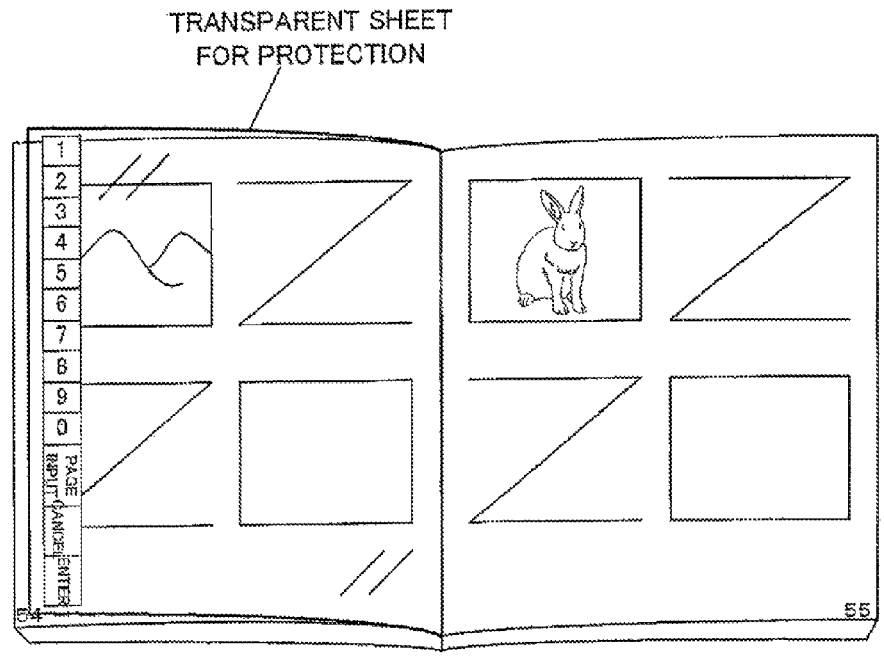

FIGS. 15A and 15B are diagrams showing a case using a grid sheet printed with dot patterns on both sides. In this case, the grid sheet can be used while the sheet is being inserted between pages. That is, when using the grid sheet for the right page, a user places the grid sheet on the right page as shown in FIG. 15A, then the surface printed with icons on the right side faces upward. Next, when using the grid sheet for the left page, turns the page while keeping the grid sheet being inserted between pages as shown in FIG. 15B, then the surface printed with icons on the left side faces upward. It should be noted that the icons are printed on both sides with ink.

Figure 16A:
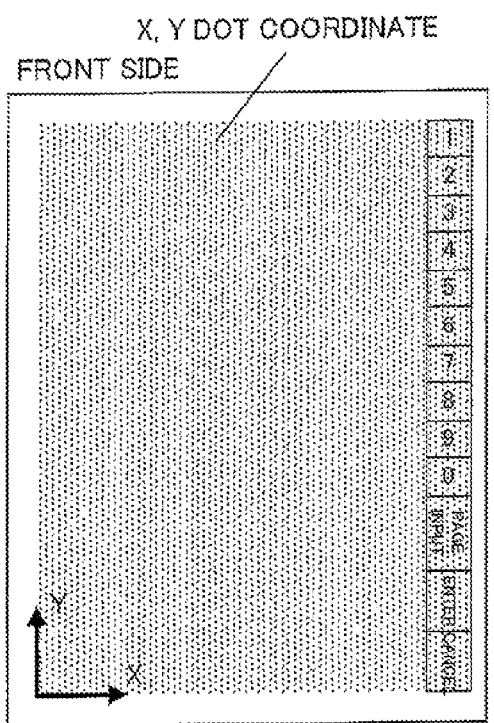
FIGS. 16A to 16C are front views and a sectional view of a grid sheet used in FIGS. 15A and 15B.
Figure 16B:
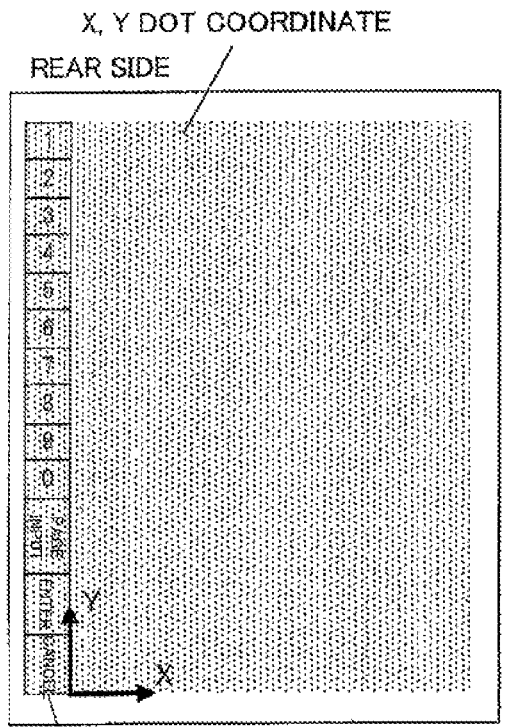

FIG. 16 is a front view showing the front side of a grid sheet, and FIG. 16B is a front view showing the rear side of the grid sheet. The front side of the grid sheet is printed with a dot pattern signifying XY coordinates over almost the entire surface, and icons indicating numbers from zero to nine and texts of "Page Input," "Enter," and "Cancel" are superimposed and printed with dot patterns signifying code values on the right part. These icons are icons for inputting indexes that specify prints by a scanner. The rear side of the grid sheet is printed with a dot pattern signifying XY coordinates over almost the entire surface, and icons and dot patterns same as the ones on front side are superimposed and printed on the left part.

Figure 16C:
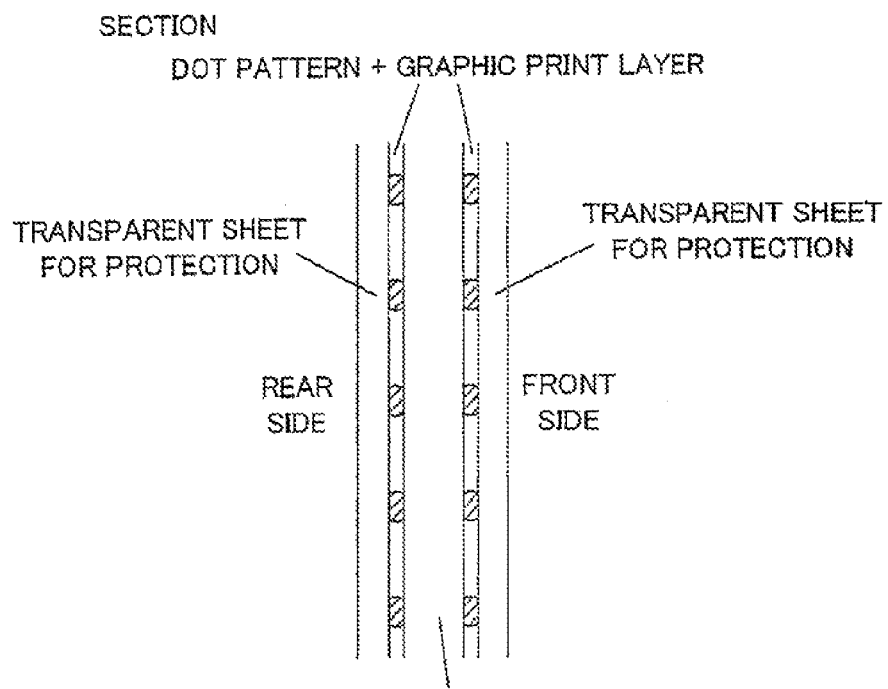

FIG. 16C is a sectional view of a grid sheet. This grid sheet is composed of layers of a transparent sheet for protection, a dot pattern+graphic print sheet, an infrared diffuse reflection layer, a dot pattern+graphic print layer, and a transparent sheet for protection in the order from the rear side.

FIGS. 17A to 17C are diagrams showing a system for displaying information on a display unit by a touch on the grid sheet by a user.

As shown in FIG. 17A, a user covers a print with a grid sheet and touches the grid sheet with a scanner. The central processing unit (CPU) inside the scanner analyzes the dot pattern, converts into a coordinate value or/and a code value, and transmits to a personal computer through a USB cable. It should be noted that the central processing unit inside the personal computer may be used instead to analyze and convert the dot pattern into the coordinate value or/and the code value.

The coordinate value means the value of an XY coordinate in a dot coordinate system. Also, the code value of an index that specifies a print paper surface a page, a title) that is input by touching an icon printed on the grid sheet or the code value of an index that is input using a keyboard, means, for example, a page number of the print paper surface. Here, it is assumed that page n is specified. If a mask that specifies print information including a text, an illustration, and a photograph, by means of an XY coordinate value, and multimedia information corresponding to the mask number are configured in advance, the central processing unit in the personal computer refers to a dot coordinate-mask no correspondence table (FIG. 17B) stored in the hard disc, based on the XY coordinate value of a dot pattern read by the scanner. The table is provided for each page, and, in this embodiment, the dot coordinate-mask no, correspondence table of page n is referred to, then, the mask number of the touch position is detected. For example, if the cross part indicated in FIG. 17B is the touch position, mask number is one. Next, a page number-mask no-multimedia information file correspondence table, as shown in FIG. 17C, is referred to. The table registers a multimedia information file corresponding to a page number and a mask number. For example, a Web address is registered for mask 1 of page n, and a local drive and an execution file are registered for mask 2 of page n. From the table, multimedia information corresponding to a certain page number and mask number is searched and output. That is, as the page number is n and the mask number is 1, a Web page of the registered Web address is displayed.

Figure 18:
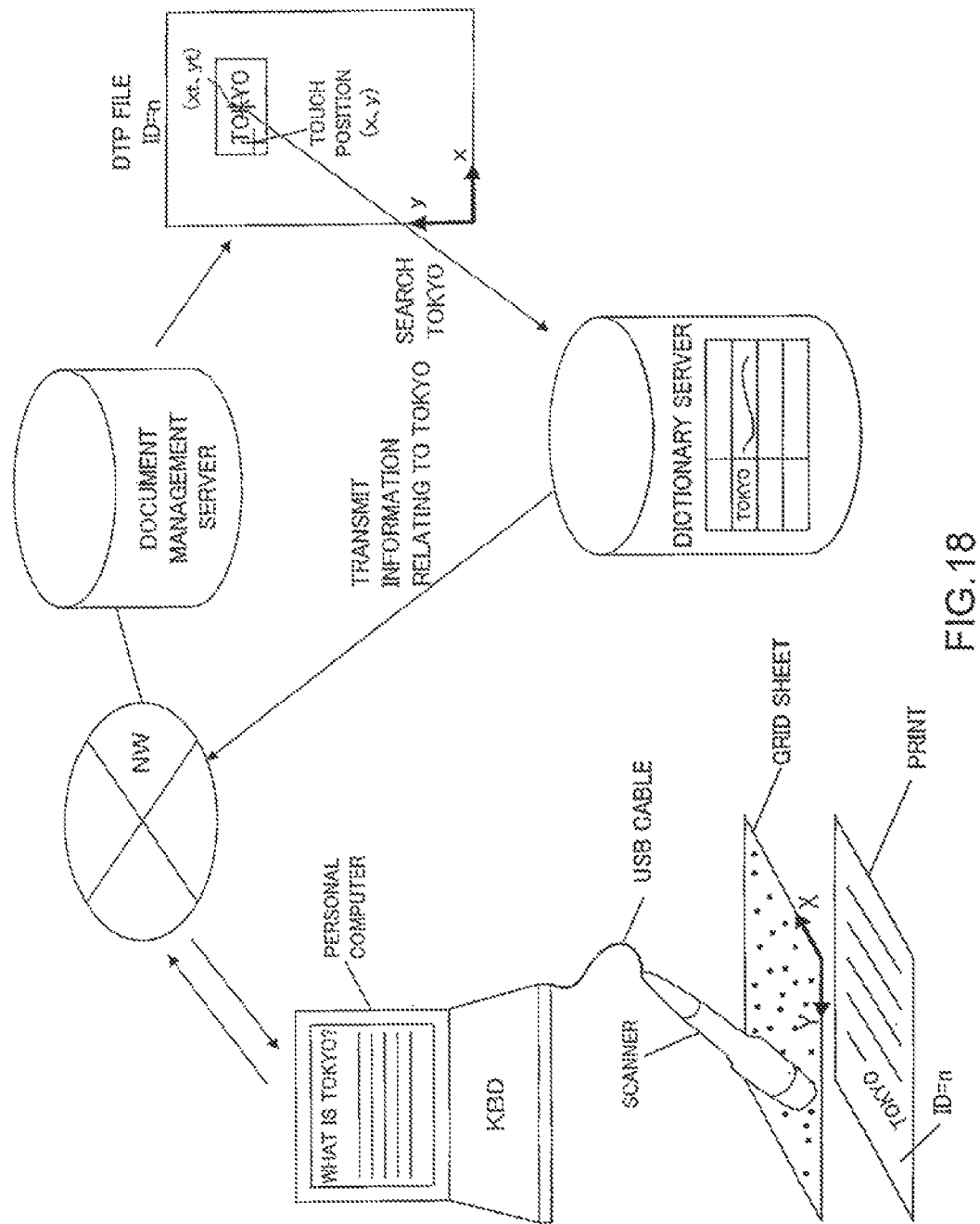
FIG. 18 is a diagram showing another embodiment of a system for displaying information on a display unit by touching a sheet by a user.

FIG. 18 is a diagram showing another embodiment of the system for displaying information on a display unit by a touch on a sheet by a user.

As an example, a case where a word "Tokyo" is touched on a print indicating "Tokyo" in the text is described by referring to FIG. 18.

As shown in FIG. 18, a user inputs an index that specifies a print paper surface by touching an icon printed on the grid sheet, or inputs an index on a keyboard to specify a print paper surface. The user, then, covers a print with a grid sheet, and touches the dot pattern of the part where "Tokyo" is indicated by the scanner. Accordingly, the central processing unit (CPU) inside the scanner analyzes the dot pattern, converts into a coordinate value or/and a code value and a dot XY coordinate, and transmits to a personal computer through a USB cable. It should be noted that the central processing unit inside the personal computer may instead be used to analyze and convert into the coordinate value or/and code value.

The central processing unit (CPU) of the personal computer converts the print paper surface ID and the dot coordinate that were obtained from the above process into an xy coordinate of DTP (Desktop Publishing) layout (an xy coordinate in the DTP layout of the original data of the print).

Next, the central processing unit (CPU) of the personal computer accesses the document management server through a network (NW). The document management server stores a DTP file corresponding to each print paper surface. The central processing unit (CPU) retrieves the DTP file corresponding to the print paper surface (e.g., ID=n) from the document management server. Then, in the DTP file of ID=n, DTP coordinates (xt, yt) closest to the touch position (x, y) is selected and "Tokyo" is specified. The DTP coordinates (xt, yt) are coordinates at the central position of the text region. After searching the DTP coordinates, the central processing unit accesses the dictionary server and searches a data file indicating a specified text, illustration, photograph, and the like. The dictionary server stores relevant information including descriptions, URLs, and multimedia information, corresponding to the data file indicating the specified text, illustration, photograph, and the like. The central processing unit (CPU) of the document management server searches "Tokyo" from the dictionary server based on the program, and automatically transmits the relevant information through the network (NW) to the personal computer. As a result, the description relating to "Tokyo" is output and displayed on the display unit of the personal computer.

In this way, just a touch with a scanner on a grid sheet covering a print can display, on a screen, a detailed description of a text, illustration, photograph, and the like of a print.

Conventionally, a dot pattern is superimposed and printed with a text, illustration, a photograph, and the like on a print, and then a user touches the print with a scanner, in order to output information relating to the touched text, etc. However, in this way, already printed media cannot be dealt with, and another medium should be printed. With the present invention, as a print is used with a sheet covering therewith, an existing print may also be dealt with. Also, one sheet may be commonly used for a plurality of prints, which enhances convenience.

Figure 19:
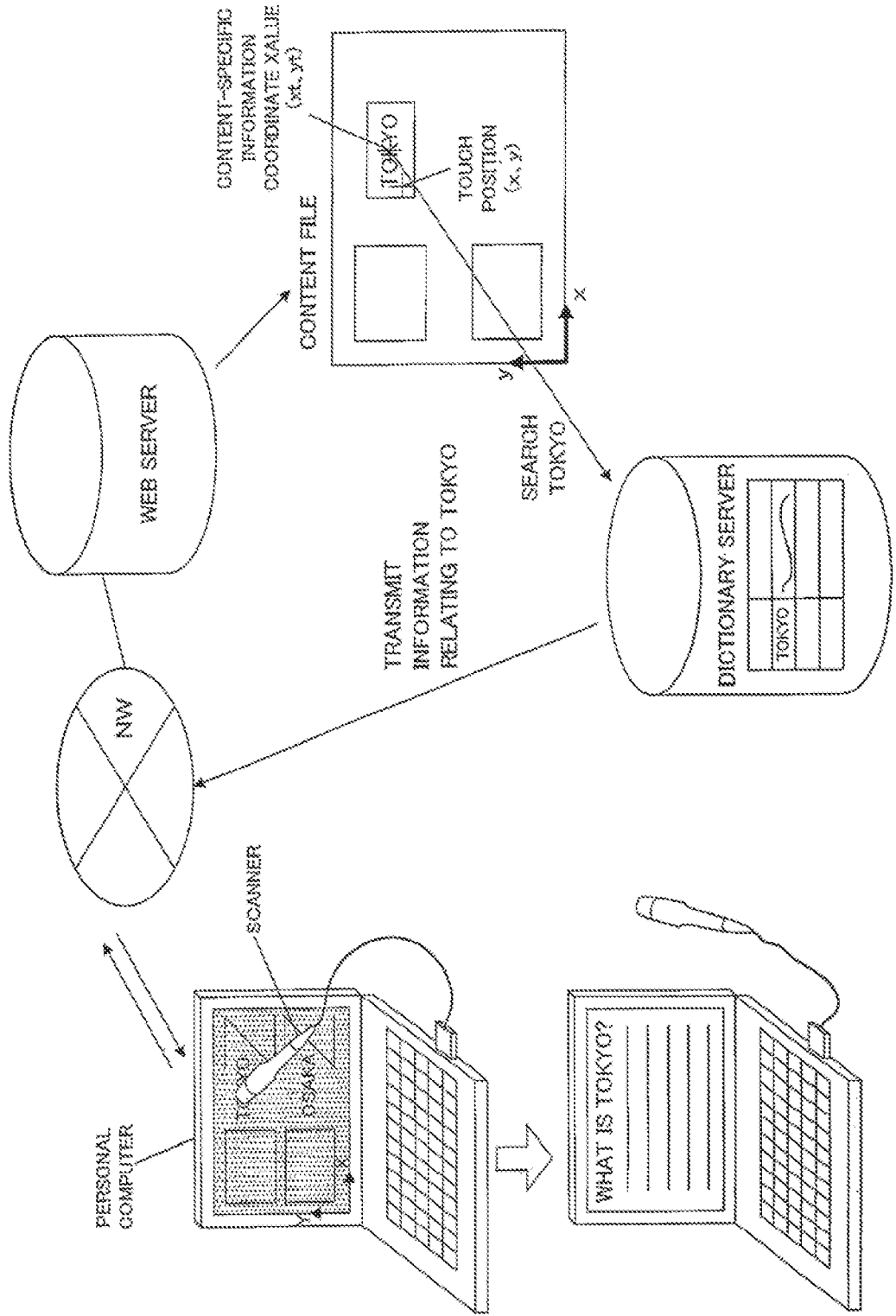
FIG. 19 is an explanatory diagram showing an embodiment where a grid sheet is attached on a display unit, content-specific information touched by a scanner is recognized, and relevant information is automatically searched and output.

FIG. 19 is a drawing illustrating an embodiment in which a grid sheet is attached on a display unit, content-specific information touched with a scanner is recognized, and relevant information is automatically searched and output.

As an example, a case touching a word "Tokyo" displayed in a display screen is described with reference to FIG. 19.

As shown in FIG. 19, a grid sheet is attached on the display screen of the personal computer. A user touches the dot pattern of a part indicating "Tokyo" with a scanner. Then, the central processing unit (CPU) inside the scanner analyzes the dot pattern, converts into an XY coordinate, and transmits to the personal computer through a USB cable. This XY coordinate is an XY coordinate value of the touch position in a dot coordinate system. It should be noted that the central processing unit of the personal computer may instead be used to analyze and convert into the coordinate value.

Next, the central processing unit (CPU) of the personal computer accesses through a network (NW) a Web server of each content displayed on the display unit. Each content file is stored in the Web server. The central processing unit retrieves a content file (HTML, XML, Flash file, etc.), and, for the retrieved content file, an XY coordinate value of the touch position in the dot coordinate system is converted into the xy coordinate value in the format information of the content, such as HTML, XML, or Flash.

It should be noted that if the displayed content file is in the personal computer, the central processing unit of the computer does not have to access the Web server to retrieve a content file.

Next, a coordinate value (xt, yt) of content-specific information for a text, illustration, and photograph, etc. displayed in the display unit, closest to the touch position coordinate value (x, y), is searched. The coordinate value (xt, yt) of the content-specific information is the coordinates of the central position of the content-specific information. After recognizing the content-specific information, the central processing unit of the personal computer searches the multimedia information, such as sound information and image information, corresponding to the data file, etc indicating the recognized text, illustration, or photograph from database of the electric dictionary or in which corresponding multimedia information is set in advance. The dictionary server stores content relating information such as a description, URL, or multimedia information, corresponding to the data file indicating a text, an illustration, or a photograph. The central processing unit (CPU) searches "Tokyo" from the dictionary server and automatically outputs the content relating information through a network (NW) to the personal computer. In this manner, descriptions relating to "Tokyo" are displayed on the display unit of the personal computer.

In this way, just placing a grid sheet on a display unit enables displaying, on a screen, of detailed descriptions of a text, illustration, photograph, and the like on the display unit.

Figure 20:
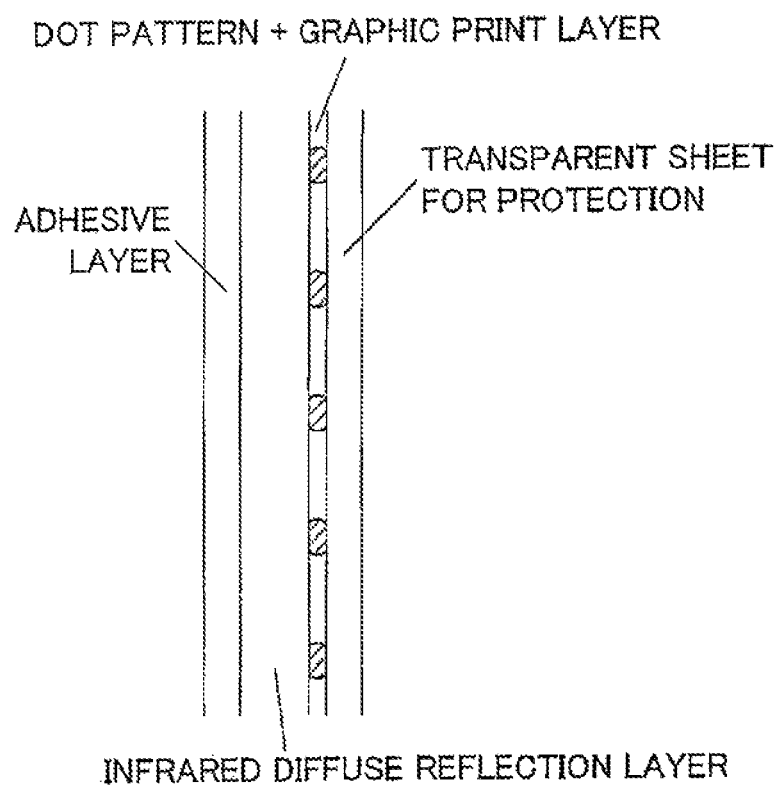
FIG. 20 is a sectional view of a grid sheet used by being attached on a display unit.

FIG. 20 is a longitudinal sectional view of a grid sheet used in such an embodiment. The grid sheet is composed of an adhesive layer, an infrared diffuse reflection layer, a dot pattern+graphic print layer, and a transparent sheet for protection, in the order from the rear side.

Figure 21:
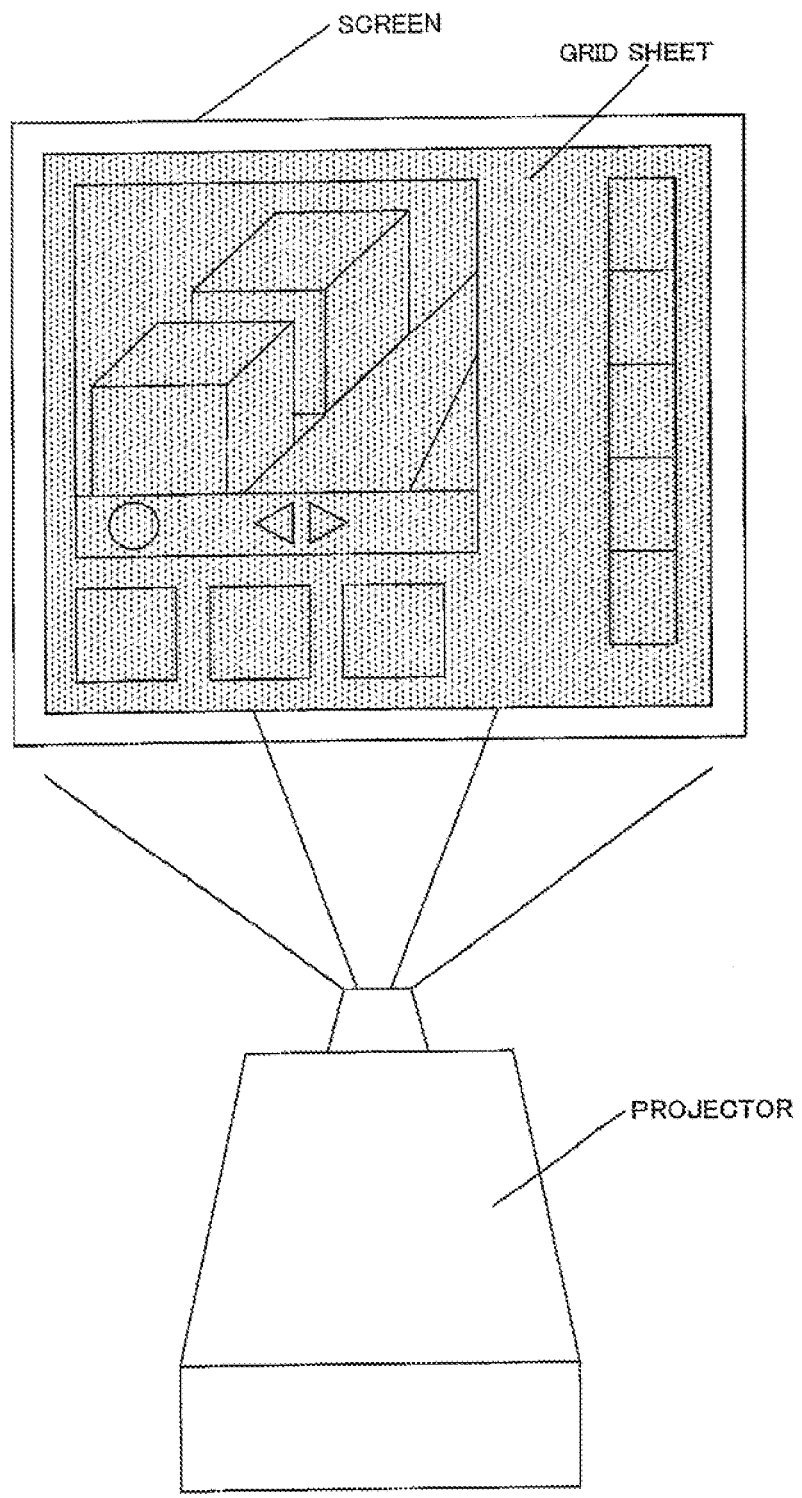
FIG. 21 is a diagram showing a case where a grid sheet is used with projector system.

FIG. 21 is a drawing describing a case where a grid sheet is used for a front projector system.

In this embodiment, the grid sheet is used by being attached on a screen. The screen displays a predetermined image by projections from a projector. The projector is connected to a personal computer or a movie delivering system not shown in the drawing. When an arbitrary position is touched using a scanner connected to the personal computer, the dot pattern of that position is read by the scanner and converted into a coordinate value in the personal computer. In the hard disc device of the personal computer or in the movie delivering server an index table relating the coordinate value to an instruction or address, etc. is referred to, and accordingly, output of multimedia information or instruction of an operation prescribed in the corresponding address is performed.

Figure 22:
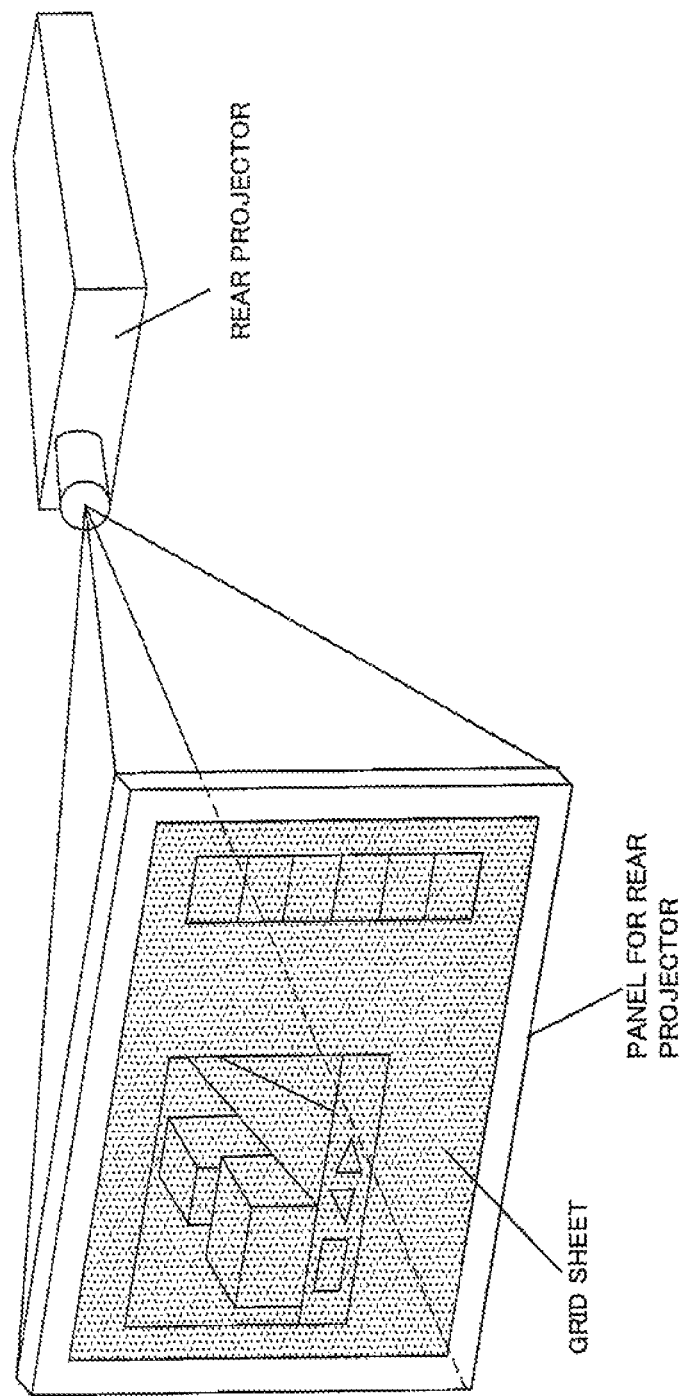
FIG. 22 is a diagram showing a case where a grid sheet is used with a rear projector system.

FIG. 22 is an example using a panel for a rear projector. In this system, the rear projector projects a movie from behind.

The front side of the panel for the rear projector is attached with a grid sheet. The structure of the grid sheet is the same as the one shown in FIG. 20.

A predetermined image is displayed on the panel for the rear projector by projection from the rear projector. The rear projector is connected to a personal computer or a movie delivering system not shown in the drawing. When an arbitrary position of the panel for the rear projector is touched with a scanner connected to the personal computer, the dot pattern of the position is read by the scanner and convened into a coordinate value in the personal computer. In the hard disc of the personal computer or in the movie delivering server, an index table relating the coordinate value to an instruction or address, etc. is referred to, and accordingly, output of multimedia information or instruction of an operation prescribed in the corresponding address is performed.

Figure 23A:
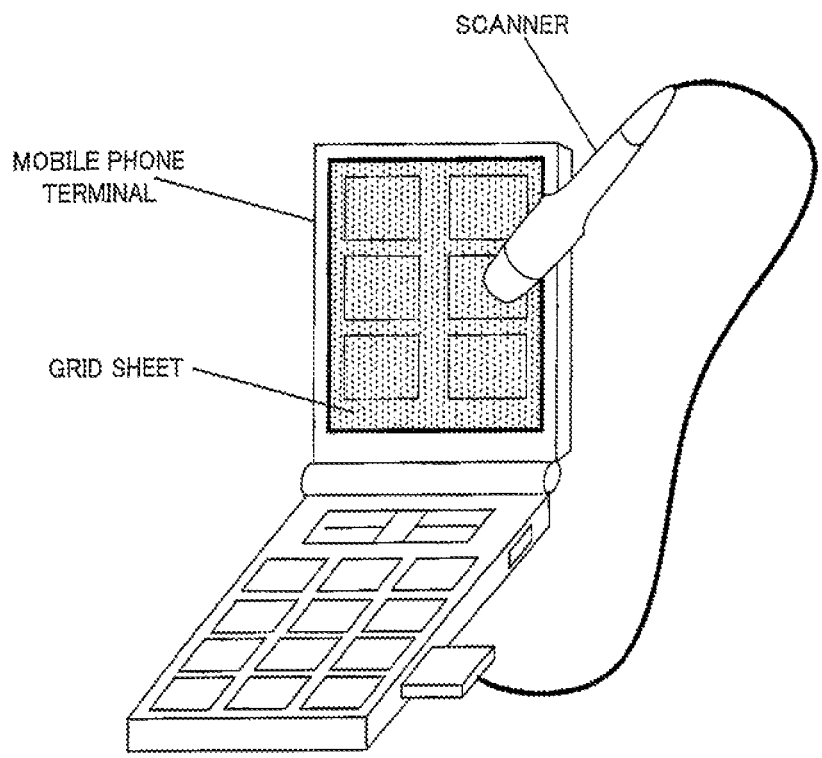
FIG. 23A is a diagram showing a case where a grid sheet is used with a mobile terminal.

FIG. 23A is an example where a grid sheet is used with a mobile phone. The grid sheet is attached on the display unit of the mobile phone, and touched by a wireless scanner or a scanner connected to the mobile phone through a cable. Then, the dot pattern of the position is read out by the scanner and converted into a coordinate value in the scanner or in the mobile phone. In the memory of the mobile phone or in the dot code management server for mobile phones, an index table relating the coordinate value to an instruction or address, etc. is stored. The central processing unit in the mobile phone refers to the index table and performs output of multimedia information or instruction of operation prescribed in the corresponding address.

Figure 23B:
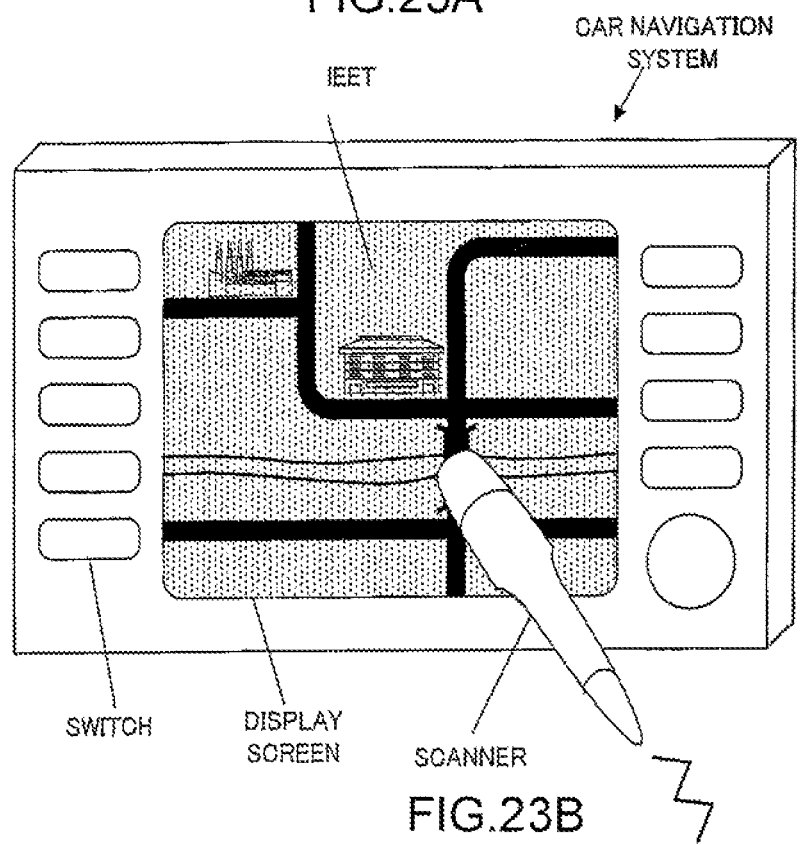
FIG. 23B is a diagram showing a case where a grid sheet is used with a car navigation system.

FIG. 23B is an example using a grid sheet for a car navigation system.

As such, when using the grid sheet for a car navigation system, the connection between the scanner and the car navigation system is preferably conducted by means of wireless connection, such as by Bluetooth. Also, the scanner may transmit data corresponding to the read dot pattern to a server through a mobile phone network by connecting with the mobile phone.

Further, the car navigation system shown in FIG. 23B can be used with a map, such as a sightseeing guide printed with a dot pattern as a print.

Figure 24:
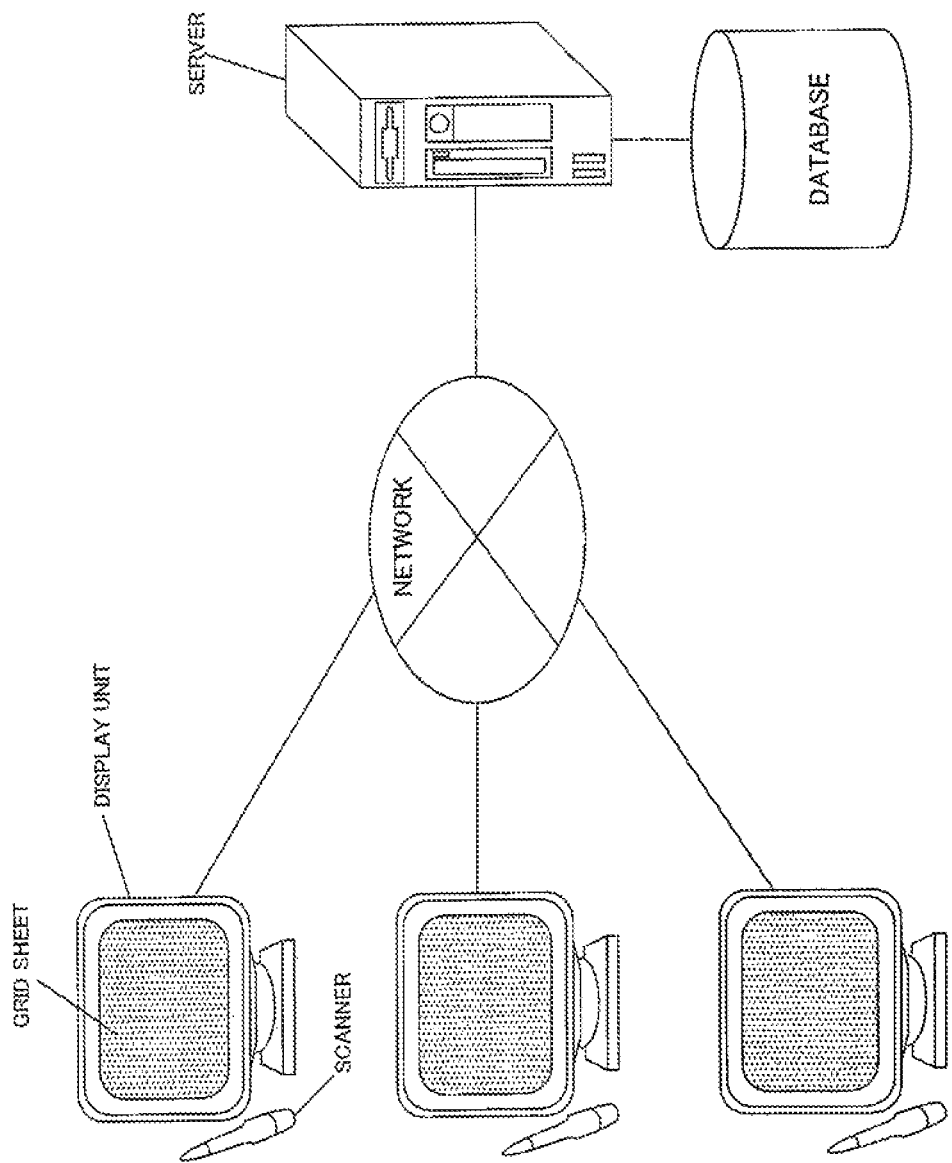
FIG. 24 is a block diagram of a thin client system using a grid sheet.
Figure 25:
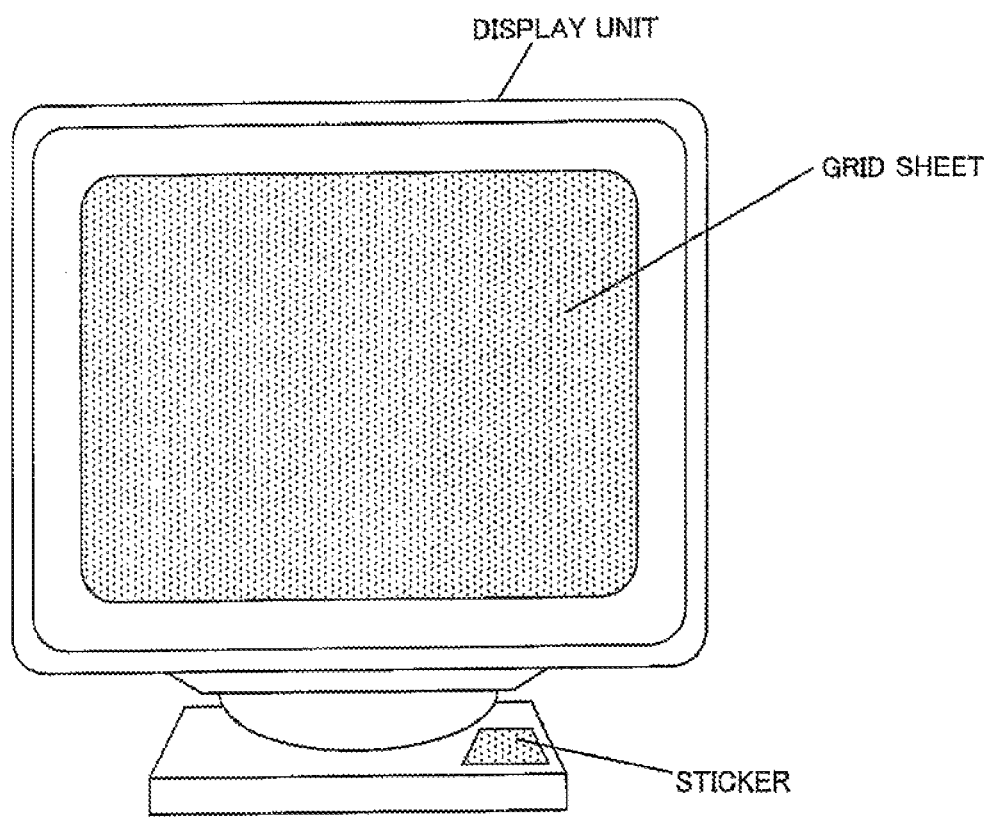
FIG. 25 is a diagram showing an example of a display unit and a sticker used in a thin client system.

FIGS. 24 to 25 are diagrams illustrating an embodiment using a grid sheet of the invention for a thin client system.

Thin client is a general term meaning a system in which a client terminal used by a user has minimum functions and a server side manages resources such as application software and files.

As shown in FIG. 24, in this embodiment, a plurality of display units are connected to a server (information processing device) through a network. As a display unit, variable forms of display units without embedded CPUs may be used including a general television monitor and a display unit for a personal computer. The display screen of each display unit is attached with an information input help sheet. The server and each display unit are connected by a wired method, such as RDP, USB, and BNC (Bayonet Neil Concelman), or a wireless method. Also, the server and the scanner are connected by a wired method or a wireless method.

If a user touches the dot pattern of the grid sheet with the scanner, the dot pattern of the position is read out by the scanner and converted into an XY coordinate value in the scanner. In the hard disc device of the server, an index table relating the XY coordinate value to an instruction or address is stored. The central processing unit of the server refers to the index table and performs output of multimedia information or instruction of an operation prescribed in the corresponding address.

In this way, attaching, a grid sheet on a display screen enables a touch-panel style input with a simple terminal system of only a display unit.

It should be noted that the dot pattern may register code values as well as XY coordinate values. The code values are for identifying each display. In this case, after reading a dot pattern, the scanner transmits a code value and an XY coordinate value to a server (information processing device). The server recognizes which display unit the code value refers to, and recognizes a variety of multimedia information and/or an operation instruction corresponding to each display unit and displays the output information on the display units.

Further, an XY coordinate value which uniquely identities a display unit may be printed as a dot pattern. In this case, the sheet is printed with XY coordinates which are divided from a larger region, and the sheet is used selectively for each display. That is, an XY coordinate value is different for each display unit. If the XY coordinate value read by the scanner is transmitted to the server (information processing unit), the server identifies which display unit was manipulated based on the XY coordinate value. Then, the server recognizes a variety of multimedia information output and/or an operation instruction corresponding to each display unit and displays the output information on the display units.

Furthermore, a sticker printed with a dot pattern of a code value which identifies each display may be attached on the display unit, as shown in FIG. 25. A user touches a grid sheet after touching the sticker. A server identifies which display unit was manipulated based on the code value registered in the dot pattern of the sticker. Next, the server recognizes the touch position by the user based on the transmitted XY coordinate value from the dot pattern of the grid sheet, recognizes a variety of multimedia information and/or operation instruction corresponding to each display unit, and displays the output information in the display unit. The sticker may be made from the same material used for a general papery adhesive sticker printed with a clot pattern thereon or the grid sheet of the invention.

As such, using the thin client method enables provision of a system with low cost, since variable forms of display units including a general television monitor without an embedded CPU and a display unit for a personal computer may be used.

<Calibration>

FIGS. 26A to 29B are diagrams illustrating a calibration performed when using a grid sheet.

To output information accurately reflecting the instruction displayed on the touch position when a user touches a display unit or a print, position relation between the coordinate system of the display unit or print, and the coordinate system of a grid sheet needs to be matched. To this end, a calibration is performed for properly relating the coordinate system of the display unit or print and the coordinate system of the grid sheet.

FIGS. 26A to 27C are diagrams illustrating a case where a calibration is performed on the display screen of a display unit.

Figure 26A:
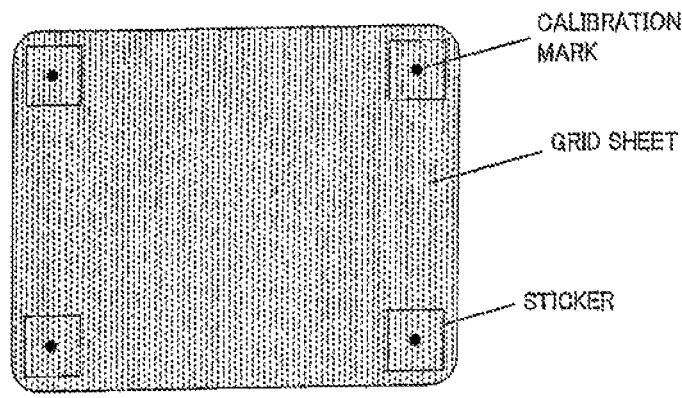
FIGS. 26A to 26C are diagrams illustrating a calibration method to a display unit, and a grid sheet used in the calibration.
Figure 26B:
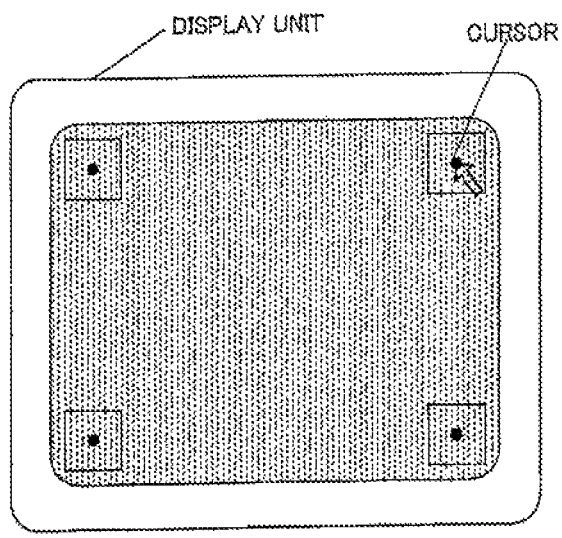
Figure 26C:
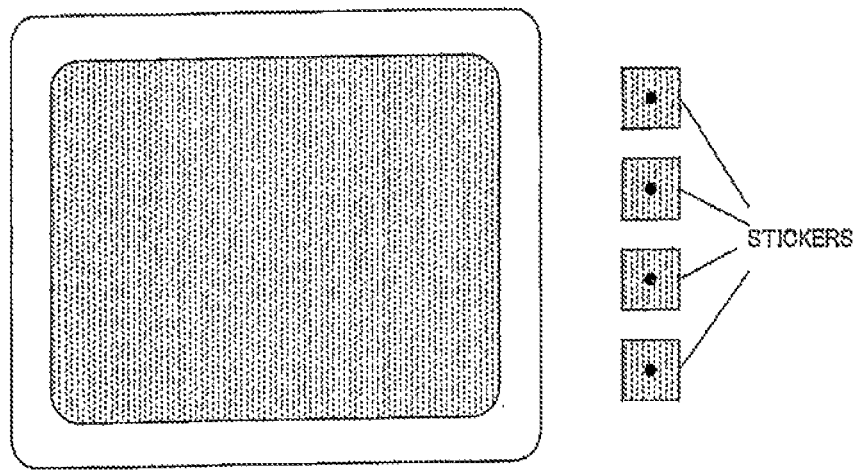

FIGS. 26A to 26C are diagrams illustrating a case where calibration marks are provided for a grid sheet.

As shown in FIG. 26A, calibration marks are provided in the vicinity of four corners of one side of the grid sheet. It should be noted that the calibration marks do not have to be provided in the vicinity of the four corners, and may be provided at two or more corners or at the center, or both at two or more corners and the center.

As shown in FIG. 26B, a user moves a cursor to a calibration mark and left-clicks a mouse. The central processing unit of a personal computer recognizes the clicked position, then properly relates the coordinate system of the display unit and the coordinate system of the grid sheet. As such, calibration is performed.

In FIG. 26B, the calibration marks are formed on a detachable transparent sticker. A user peels off a sticker as shown in FIG. 26C after the calibration is completed.

It should be noted that the calibration marks may be directly printed on a grid sheet as well as formed on the transparent sticker. Moreover, the calibration marks may be provided on a grid sheet in a removable state and removed from the grid sheet after calibration is completed.

Figure 27A:
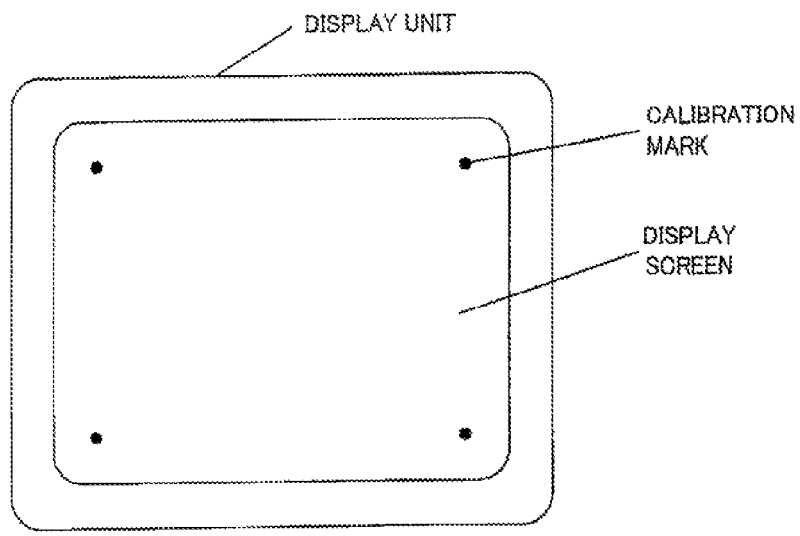
FIGS. 27A to 27C are diagrams illustrating another embodiment of calibration method to a display unit.
Figure 27B:
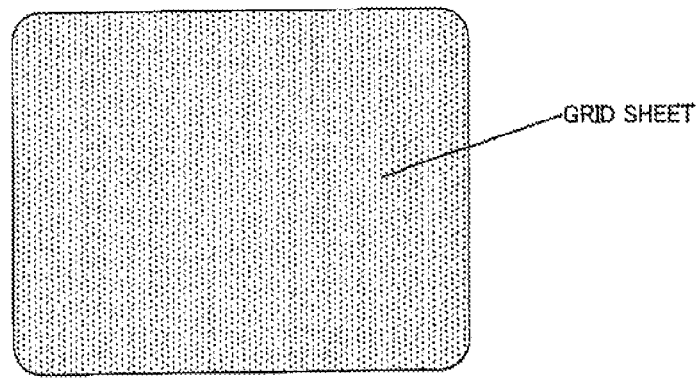
Figure 27C:
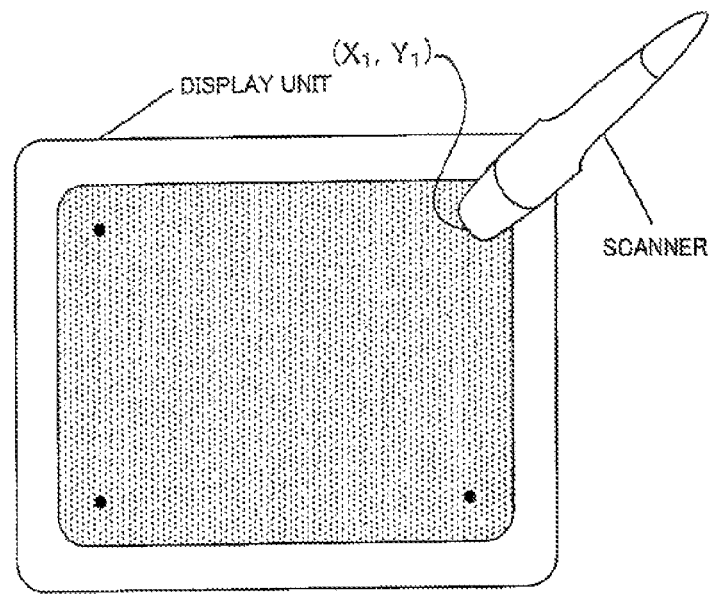

FIGS. 27A to 27C are diagrams illustrating a case where the calibration marks are used for the display screen of a display unit.

As shown in FIG. 27A, calibration marks are displayed in the vicinity of four corners of the display unit. It should be noted that the calibration marks do not have to be provided in the vicinity of the four corners, and may be provided at two or more corners or at the center, or both at two or more corners and the center.

A user touches the positions indicating calibration marks on a grid sheet as shown in FIG. 27C. The scanner reads out the dot pattern on the grid sheet and transmits to a personal computer. The central processing unit of the personal computer recognizes XY coordinates (X1, Y1) of the dot at the touch position based on the transmitted dot pattern, and performs a calibration for properly relating the coordinate system of the display unit to the coordinate system of the grid sheet.

It should be noted that, after the calibration is completed, the calibration marks will not be displayed.

FIGS. 28A to 29B are diagrams illustrating a case where a calibration is conducted for a print.

Figure 28A:
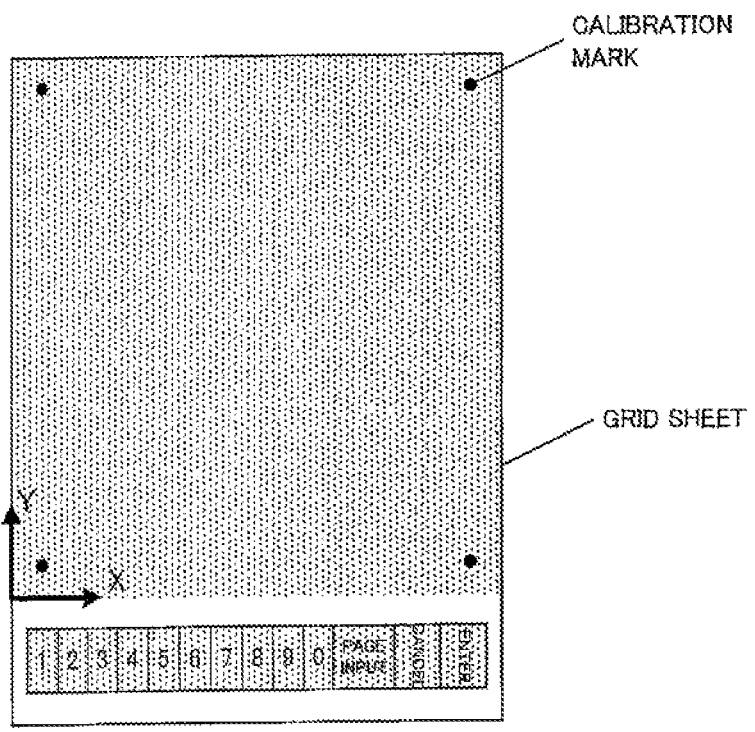
FIGS. 28A and 28B are diagrams illustrating a calibration method to a print and a grid sheet used in the calibration.
Figure 28B:
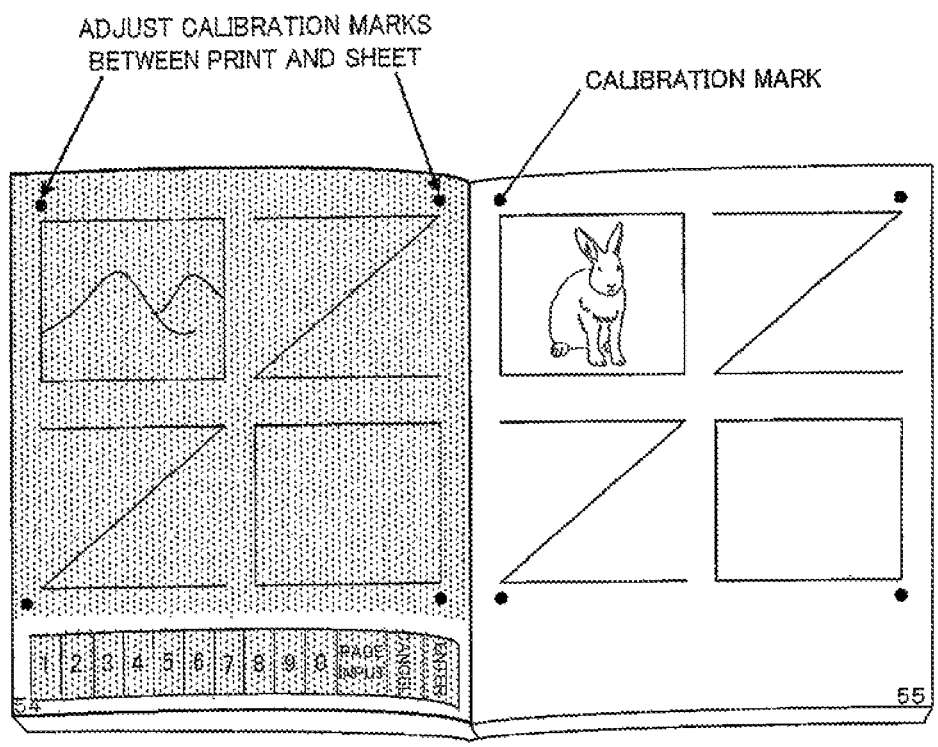

FIGS. 28A and 28B are diagrams illustrating a case where calibration marks are provided for both a print and a grid sheet for the print.

As shown in FIG. 28A, calibration marks are printed in the vicinity of four corners of the grid sheet and the print, respectively. It should be noted that the calibration marks do not necessarily be printed in the vicinity of the four corners, and may be printed on two or more corners.

A user matches both calibration marks and covers the prim with the grid sheet. In this way, a calibration is performed for properly relating the coordinate system of the print and the coordinate system of the grid sheet.

Figure 29A:
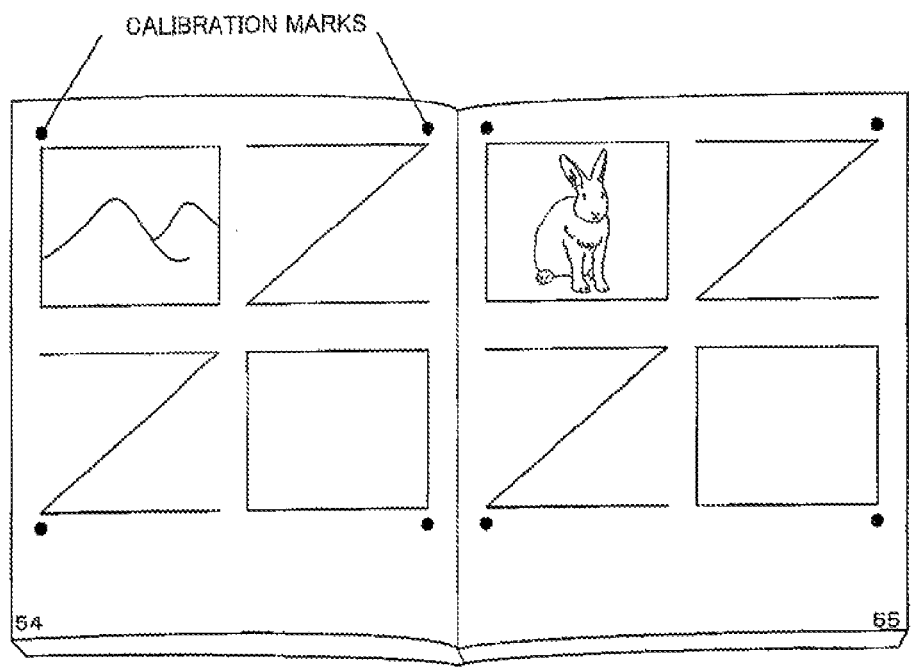
FIGS. 29A and 29B are diagrams illustrating another embodiment of a calibration method to a print.
Figure 29B:
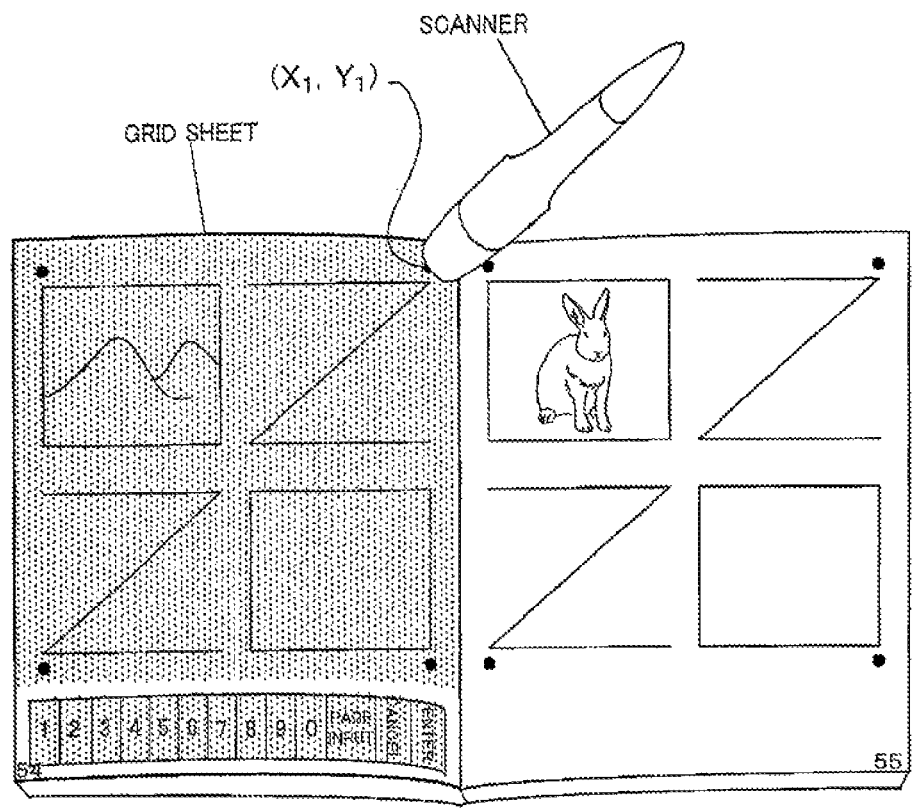

FIGS. 29A and 29B are diagrams illustrating a case where calibration marks are printed only on a print.

As shown in FIG. 29A, calibration marks are printed in the vicinity of four corners of the print. It should be noted that the calibration marks do not necessarily be printed in the vicinity of the four corners, and may be printed on two or more corners. A user covers the print with the grid sheet and adjusts the scanner to the marks. The scanner reads the dot pattern on the grid sheet, and transmits to a personal computer. The central processing unit of the personal computer recognizes XY coordinates (X1, Y1) of the touch position based on the transmitted dot pattern, and performs a calibration for properly relating the coordinate system of the print to the coordinate system of the grid sheet.

Conducting such a calibration enables matching of position relation between the coordinate position of the grid sheet and the image of the display unit or the print, and as a result, output of information corresponding to the image or text touched by a user is accurately performed.

It should be noted that, in each above-described embodiment, when using a grid sheet on a display screen, etc other methods may be used, including hanging the grid sheet at the top of the display screen as well as attaching the grid sheet with adhesive agent.

The invention may be used as a touch panel by attaching the sheet on screens of a variety of displays including the ones for a personal computer, PDA, and bank ATM. Further, by covering a print with the sheet and outputting, on a screen, information relating to the information indicated in the print, the invention may be used for dictionaries, mail order catalogs, learning materials, and the like.

What is claimed is:

1. An information input help sheet, on which is provided a dot pattern which defines an XY coordinate value and/or a code value generated by a dot-code generating algorithm, comprising:

an infrared diffuse reflection layer which diffusely reflects infrared rays from one side and has a characteristic to transmit visible light; and a dot pattern layer provided on the one side of the infrared diffuse reflection layer and on which is printed the dot pattern comprising the dots formed with material having an infrared absorbing characteristic.

2. The information input help sheet according to claim 1, wherein the infrared diffuse reflection layer further has a characteristic not to reflect or transmit infrared rays from an opposite side of the one side.

3. The information input help sheet according to claim 1, wherein the dot pattern layer is a first dot pattern layer; a second dot pattern layer is further provided on an opposite side of the one side; and the infrared diffuse reflection layer has a characteristic to diffusely reflect the infrared rays from the opposite side.

4. The information input help sheet according to claim 1 wherein a protection layer that has a characteristic to transmit infrared light and visible light is provided on a further external surface of the dot pattern layer.

5. The information input help sheet according to claim 1, wherein the dot pattern layer is printed on an infrared diffuse reflection layer side of a protection layer that has a characteristic to transmit infrared light and visible light.

6. The information input help sheet according to claim 1 wherein the dot pattern layer or other layers are superimposed and printed with a graphic including a text, an illustration, and a photograph with an ink made of infrared transmitting material or infrared reflecting material.

7. The information input help sheet according to claim 1 wherein an adhesion layer is provided on an opposite side of the one side of the infrared diffuse reflection layer.

8. An information processing system using the information input help sheet, comprising:
the information input help sheet according to claim 1;
a display unit on which the information input help sheet is placed and information is displayed;
a dot-pattern reading unit that reads the dot pattern on the information input help sheet; and
an information processing device that causes the display unit to display the information based on the dot pattern read out by the dot-pattern reading unit.

9. The information processing system using the information input help sheet according to claim 8, wherein the information processing device is a personal computer, a PDA, a television receiving set, a front or rear projector, a game machine, a karaoke machine, a mobile phone terminal, a POS terminal, an ATM, a KIOSK terminal, a car navigation system, a pachinko, a watch, or a smart phone, and the information input help sheet is disposed, as a touch-panel style input device, on a display screen of the display unit or a screen.

10. A system for outputting content-related information using the information input help sheet comprising:
the information input help sheet according to claim 1, of which the dot pattern is generated by making an XY coordinate value or an XY coordinate value and a code value into a pattern in accordance with a predetermined algorithm;
a display unit on which the information input help sheet is placed and a content expressed as a text, an illustration, a photograph, and a movie is displayed;
a dot-pattern reading unit that reads the dot pattern on the information input help sheet;
an analysis unit that analyzes the dot pattern at a touch position read out by the dot-pattern reading unit and converts the dot pattern to the XY coordinate value;
an output unit that outputs content-related information relating to the content displayed on the display unit that is recognized by the XY coordinate value.

11. The system for outputting content-related information using the information input help sheet according to claim 10, further comprising:
an acquiring unit that acquires a content file corresponding to the content displayed on the display unit;
a converting unit that converts the XY coordinate value at the touch position to an XY coordinate in the content file;
a recognizing unit that searches a coordinate value of content specific information nearest to the XY coordinate of the touch position, and recognizes the content specific information; and
a searching unit that searches content-related information relating to the content specific information,
wherein the output unit outputs the content-related information searched by the searching unit.

12. A system for outputting print-related information using an information input help sheet, comprising:
the information input help sheet according to claim 1, of which the dot pattern is generated by making an XY coordinate value or an XY coordinate value and a code value into a pattern in accordance with a predetermined algorithm;
a print on which the information input help sheet is placed;
a dot-pattern reading unit that reads the dot pattern on the information input help sheet;
an analysis unit that that analyzes the dot pattern at a touch position read out by the dot-pattern reading unit and converts the dot pattern to the XY coordinate value;
an output unit that outputs print-related information relating to the print that is recognized by the XY coordinate value.

13. The system for outputting print-related information according to claim 12, further comprising:
a print identifying unit that acquires print-specific information for identifying the print;
a converting unit that converts the XY coordinate value at the touch position and the print-specific information to an XY coordinate in print information;
an acquiring unit that acquires a print file of the print;
a recognizing unit that searches the print information nearest to the XY coordinate of the touch position in the print file, and recognizes the print information; and
a searching unit that searches print-related information relating to the print information,
wherein the output unit outputs the print-related information searched by the searching unit.

14. A system for outputting print-related information using the information input help sheet according to claim 12, wherein the information input help sheet is further printed with an icon on which a text and/or a drawing pattern for inputting the print-specific information using the dot-pattern reading unit are superimposed and printed with the dot pattern.

15. The information input help sheet according to claim 1, wherein the information input help sheet is processed into a sticker shape, a card shape, a bookmark shape or a sticky note shape.

16. An information processing system using information input help sheets, comprising:
the information input help sheets, of which dot pattern is generated by making an XY coordinate value or an XY coordinate value and a code value into a pattern in accordance with a predetermined algorithm;
a plurality of display units, on which the information input help sheets are placed;
a plurality of dot-pattern reading units that read the dot pattern on the information input help sheets, analyze the dot pattern, and convert the dot pattern into the XY coordinate value; and
one or more information processing devices each comprising:
a receiving unit that is respectively connected to the display units and the dot-pattern reading units by a wired or wireless method and receives the XY coordinate value transmitted from the dot-pattern reading units;
a storage unit that stores a table where coordinate values of the information input help sheets and information and/or operation instructions are associated; and
a processing unit that refers to the table and instructs the display units to output information corresponding the XY coordinate value or to perform an operation corresponding to the XY coordinate value.

17. The information processing system according to claim 16 wherein:
the information input help sheet is printed with an XY coordinate value as well as a code value that identifies each display unit as a dot pattern;

the dot-pattern reading units transmit the read code value and XY coordinate value to the information processing devices; and the information processing devices identify the display unit by the received code value, and instruct the display unit to output information and/or to perform an operation corresponding to the identified display unit.

18. The information processing system according to claim 16 wherein:

the information input help sheet is printed with an XY coordinate that uniquely identifies each display unit;

the dot-pattern reading units transmit the read XY coordinate value to the information processing devices; and the information processing devices identify the display unit by the received XY coordinate value and instruct the display unit to output information and/or to perform an operation corresponding to the identified display unit.

19. The information processing system according to claim 16 wherein:

a sticker printed with the dot pattern of the code value that identifies each display unit is attached on a chassis of the display unit;

the dot-pattern reading units transmit the read code value to the information processing devices; and the information processing devices identify the display unit by the received code value and instruct the display unit to output information and/or to perform an operation corresponding to the identified display unit.

* * * * *